(12) United States Patent
Whiting et al.

(10) Patent No.: US 7,895,099 B2
(45) Date of Patent: *Feb. 22, 2011

(54) METHODS AND SYSTEMS FOR FACILITATING TRANSACTIONS BETWEEN COMMERCIAL BANKS AND POOLED DEPOSITOR GROUPS

(75) Inventors: Richard W. Whiting, Williamsburg, VA (US); Kim B. Winslow, Gainesville, FL (US); Victor Briabrin, Bethesda, MD (US); Tully M. Ryan, Edenton, NC (US)

(73) Assignee: Finistar, Inc., Edenton, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/569,013

(22) PCT Filed: Aug. 23, 2004

(86) PCT No.: PCT/US2004/027238
§ 371 (c)(1),
(2), (4) Date: Sep. 5, 2006

(87) PCT Pub. No.: WO2005/022314
PCT Pub. Date: Mar. 10, 2005

(65) Prior Publication Data
US 2007/0276752 A1     Nov. 29, 2007

Related U.S. Application Data

(63) Continuation-in-part of application No. 10/645,778, filed on Aug. 21, 2003.

(51) Int. Cl.
*G06Q 40/00*     (2006.01)
(52) U.S. Cl. .......................................... 705/35; 705/37
(58) Field of Classification Search .................. None
See application file for complete search history.

(56) References Cited

U.S. PATENT DOCUMENTS 4,346,442 A     8/1982  Musmanno (Continued)

FOREIGN PATENT DOCUMENTS

WO     WO 2005/022314 A2     3/2005

OTHER PUBLICATIONS

Matching Small Banks with Large Muni Deposits; Finistar Inc. deposit-brokering service,; Company Profile; Product/Service Evaluation American Banker, Oct. 4, 2005, p. 1A, 1294 words, Garmhausen, Steve.*

(Continued)

*Primary Examiner*—Thomas Dixon
*Assistant Examiner*—Benjamin S Fields
(74) *Attorney, Agent, or Firm*—Jenkins, Wilson, Taylor & Hunt, P.A.

(57) ABSTRACT

Methods and systems for facilitating transactions (200) between commercial banks and pooled depositor groups are disclosed. Employees of a control center determine interest rate return needs of pooled depositor groups (210), such as trust departments at commercial banks. The control center employees aggregate (204) the funds to produce a stable funds source and communicate the availability of the stable funds source to commercial banks for core deposits (210). The commercial banks communicate cash needs to the control center (202). The control center sets an interest rate (206) to be paid to the pooled depositor groups for use of the funds to at least the depositor groups' expected rate of return and below and the rate that commercial banks are willing to pay for the funds. The banks post master NOW accounts and the pooled depositor groups deposit funds in the master NOW accounts (212).

16 Claims, 23 Drawing Sheets

U.S. PATENT DOCUMENTS

| | | | |
|---|---|---|---|
| 4,597,046 A | 6/1986 | Musmanno et al. | |
| 4,751,640 A | 6/1988 | Lucas et al. | |
| 4,774,663 A | 9/1988 | Musmanno et al. | |
| 5,126,936 A | 6/1992 | Champion et al. | |
| 5,262,942 A | 11/1993 | Earle | |
| 5,631,828 A | 5/1997 | Hagan | |
| 5,826,243 A | 10/1998 | Musmanno et al. | |
| 5,864,685 A | 1/1999 | Hagan | |
| 5,870,724 A | 2/1999 | Lawlor et al. | |
| 6,016,482 A | 1/2000 | Molinari et al. | |
| 6,052,673 A | 4/2000 | Leon et al. | |
| 6,192,347 B1 | 2/2001 | Graff | |
| 6,363,360 B1 | 3/2002 | Madden | |
| 6,636,360 B1 | 3/2002 | Madden | |
| 6,374,231 B1 | 4/2002 | Bent et al. | |
| 6,513,020 B1 | 1/2003 | Weiss et al. | |
| 7,328,179 B2 | 2/2008 | Sheehan et al. | |
| 7,376,606 B2 | 5/2008 | Jacobsen | |
| 7,440,914 B2 | 10/2008 | Jacobsen | |
| 2002/0046144 A1 | 4/2002 | Graff | |
| 2002/0069147 A1* | 6/2002 | Sheehan et al. | 705/35 |
| 2002/0082981 A1 | 6/2002 | Madden | |
| 2002/0087454 A1 | 7/2002 | Calo et al. | |
| 2002/0091637 A1 | 7/2002 | Bent et al. | |
| 2002/0188564 A1* | 12/2002 | Star | 705/42 |
| 2002/0194099 A1 | 12/2002 | Weiss | |
| 2003/0023529 A1* | 1/2003 | Jacobsen | 705/35 |
| 2003/0041003 A1 | 2/2003 | Kayser, III | |
| 2003/0135437 A1* | 7/2003 | Jacobsen | 705/35 |
| 2003/0200174 A1* | 10/2003 | Star | 705/42 |
| 2005/0044038 A1 | 2/2005 | Whiting et al. | |
| 2006/0212385 A2* | 9/2006 | Bent et al. | 705/38 |

OTHER PUBLICATIONS

Notification of Transmittal of the International Search Report and the Written Opinion of the International Searching Authority, or the Declaration for International Application No. PCT/US04/27238 (Apr. 28, 2005).

Official Action for U.S. Appl. No. 10/645,778 (Jul. 16, 2009).

Final Official Action for U.S. Appl. No. 10/645,778 (Mar. 30, 2010).

Interview Summary for U.S. Appl. No. 10/645,778 (Mar. 29, 2010).

Commonly-assigned, co-pending U.S. Appl. No. 12/896,804 for "Methods, Systems, and Computer Readable Media for Facilitating the Exchange of Reciprocal Deposits," (Unpublished, filed Oct. 1, 2010).

Final Official Action for U.S. Appl. No. 10/645,778 (Jun. 4, 2009).

Interview Summary for U.S. Appl. No. 10/645,778 (Apr. 13, 2009).

Official Action for U.S. Appl. 10/645,778 (Mar. 31, 2008).

Notice of Allowance and Fee(s) Due for U.S. Appl. No. 10/645,778 (Oct. 20, 2010).

* cited by examiner

| DEPOSITOR GROUP | Market Info | Deposit | Withdrawal | Accounts | Transactions | Biz Rules | My Profile |

Business Rules

| No. | Date Created | Condition1 | Condition2 | Condition3 | Action | Cur.Status | Edit | Delete |
|---|---|---|---|---|---|---|---|---|
| | | | | | | | ☐ | ☐ |
| | | | | | | | ☐ | ☐ |

FIG. 10

COMMERCIAL BANK | Market Info | Borrow | Repay | Accounts | Transactions | Biz Rules | My Profile Business Rules

| No. | Date Created | Condition1 | Condition2 | Condition3 | Action | Cur.Status | Edit | Delete |
|---|---|---|---|---|---|---|---|---|
| | | | | | | | ☐ | ☐ |
| | | | | | | | ☐ | ☐ |

FIG. 16

METHODS AND SYSTEMS FOR FACILITATING TRANSACTIONS BETWEEN COMMERCIAL BANKS AND POOLED DEPOSITOR GROUPS

RELATED APPLICATIONS

This application is a continuation-in-part of U.S. patent application Ser. No. 10/645,778 filed Aug. 21, 2003, the disclosure of which is incorporated herein by reference in its entirety.

TECHNICAL FIELD

The present invention relates to methods, systems, and computer program products for facilitating financial transactions between commercial banks and pooled depositor groups. More particularly, the present invention relates to methods and systems for providing liquid deposit opportunities for pooled depositor groups and for providing deposit funds from the pooled depositor groups to commercial banks that the commercial banks may be permitted by regulatory authorities to count as stable deposits.

BACKGROUND ART

In the banking industry, it is desirable to maintain a certain percentage of core deposits. Core deposits are deposits that do not change significantly in amount with fluctuations in the interest rate paid on the deposits. Savings account deposits are one example of a bank's core deposits. In the United States, the percentage of core deposits affects the bank's ability to maintain a favorable regulatory rating.

In addition to core deposits, banks often rely on non-core funding sources, such as brokered CDs. Brokered CDs are offered by a bank to retail customers through a deposit broker. Brokered CDs are less stable as a source of funds for banks than core deposits because depositors in brokered CDs are typically sensitive to interest rate fluctuations.

Another problem with using brokered CDs to obtain cash is that in the United States, if a bank maintains too high of a percentage of brokered deposits, the bank may be sanctioned by a regulatory agency, such as the Federal Reserve for federally chartered banks or a state banking agency for state chartered banks. Yet another problem associated with using brokered deposits is that banks are required to pay a broker's commission for brokered deposits. Thus, in the banking industry, there exists a need for a new way for banks to obtain stable funds.

Pooled depositor groups, such as trust departments, pension funds, government entities, insurance companies, and any entities that are allowed to make deposits into a negotiated order of withdrawal (NOW) account, are constantly looking for safe, insured deposit vehicles for their funds. In addition, it is desirable for individual depositors in a pooled depositor group to be able to access funds without penalty on a short-term basis. Conventionally, pooled depositor groups have invested in money market funds. However, investing in money market funds is undesirable because money market funds have historically paid low interest rates. Certificates of deposit are undesirable because money is not accessible on a short-term basis without paying a penalty. In addition, under current FDIC regulations, an individual's deposits at a single institution in excess of $100,000 are not federally insured. As a result, in order to fully insure a depositor's funds, a trust department is required to divide a depositor's assets in excess of $100,000 among multiple banks. Accordingly, in light of these difficulties associated with conventional cash management vehicles, there exists a need for an insured or collateralized deposit vehicle for pooled depositor groups.

Other entities, such as individual depositors (including corporations and human beings) may also seek insured, liquid deposit opportunities for their funds. These entities face the same difficulties as those described above for pooled depositor groups. Accordingly, there exists a need for an insured or collateralized deposit vehicle for individual depositors.

Yet another problem that exists in financial transactions is unrelated to insurance. It may be desirable to provide a method for depositors to spread deposits among multiple commercial banks for security reasons. For example, it may be desirable for depositors to deposit funds in commercial banks in different countries to avoid risks associated with economic and political instability. Currently there is no efficient system for matching depositors' deposit needs to commercial banks' cash flow needs when the banks are located in different countries. Accordingly, there exists a long felt need for improved methods and systems for allowing depositors to distribute deposits among commercial banks.

DISCLOSURE OF THE INVENTION

In order to address the aforementioned problems associated with providing cash to commercial banks and providing insured, liquid deposit opportunities for pooled depositor groups and individual depositors, one aspect of the invention includes a method and associated computer software for facilitating transactions between depositors and commercial banks. In one exemplary method, banks and depositors register with a control center. Control center employees may solicit deposit cash from different depositors and aggregate the deposit cash of the multiple pooled depositor groups to produce a stable source of funds. Alternatively, if a single depositor has a large amount of excess cash that the entity is willing to deposit, aggregation of cash from different sources may not be required. The control center may then notify banks of the stable source of funds and inquire as to the interest rate that banks are willing to pay for the stable source of funds.

In order to receive funds from the stable source of funds, a bank will post a deposit account with an appointed custodian. For government entities, trust departments, pension funds, and non-profit organizations, the deposit account may be a master NOW account. For other entities, such as individuals (including human beings or corporations), the deposit account may be a money market deposit account (MMDA) or other time or interest bearing deposit accounts. The control center sets an interest rate to be paid on the deposit accounts based on the rate that the bank is willing to pay for all or a portion of the stable funds source and the rate of return that the depositors expect on their deposits. The control center notifies the depositors of the availability of the deposit account at the specified interest rate. The depositor then deposits funds in the deposit account. The control center monitors transactions between the depositors and the custodian and between the custodian and the banks and generates reports.

Because the control center can aggregate deposit funds of multiple pooled depositor groups, the pooled depositor groups should be able to offer a stable source of funds to commercial banks. As a result, banks are permitted to treat the funds received from the pooled depositor groups as stable deposits. In addition, money deposited in the master NOW accounts are FDIC insured up to $100,000 for any single depositor within the pooled depositor group. Through the control center, funds in excess of $100,000 to any single depositor are deposited in separate banks to insure FDIC coverage or the banking institution collateralizes the funds in excess of $100,000. However, by using a master NOW account, funds from a depositor group in excess of $100,000 can be fully insured provided that funds from individual depositors within the group do not exceed $100,000, as per a recent statement from the FDIC. Thus, if a depositor group of 100 depositors with $50,000 each deposits funds in a master NOW account with a single bank, the entire amount will be FDIC insured.

Another advantage of using master NOW accounts is that depositors are allowed to withdraw money from a master NOW account on a daily basis without penalty. As a result, using master NOW accounts provides a liquidity advantage over conventional certificates of deposit.

The following definitions apply to the corresponding terms used herein:

1. Commercial bank: A bank chartered by a state or federal agency with the ability to receive time and demand deposits, to make commercial and mortgage loans, and to have insured deposits. In the United States, the deposits of a commercial bank are insured by the Federal Deposit Insurance Corporation (FDIC).
2. NOW account: A NOW account refers to a negotiated order of withdrawal account, which is an account with a commercial bank that permits unlimited activity with regard to deposits and withdrawals.
3. Master NOW account: A NOW account having a predetermined limit as to the total amount that can be deposited against the account. This limit may be determined by an agreement between the commercial bank posting the account and the control center.
4. Custodian: An entity, such as a bank, with the power granted by a state or federal agency to hold assets on behalf of a pooled depositor group or a commercial bank.
5. Core deposit: A class of deposits deemed by an agency, such as the FDIC, to be stable (constant, minimum fluctuation in total amount, and available at a reasonable cost.)
6. Pooled depositor group: A group of individuals or entities that pool funds for deposit purposes and that are permitted to deposit funds in a NOW account. Examples of pooled depositor groups include trust departments, pension funds, and government entities. Currently, commercial businesses are not permitted to deposit funds in a NOW account.
7. Certificate of deposit: A certificate showing evidence of funds deposited for a specific period of time at a specific rate. The funds in a CD are not available for early withdrawal without specified penalties. CDs in excess of $100,000 are negotiable and are traded by dealers in money market investments.
8. Control center: A point through which information flows for controlling transactions between commercial banks and pooled depositor groups is controlled.
9. Stable funds: Pooled funds offered to commercial banks that preferably do not fluctuate significantly in amount as the interest rate changes.
10. Hot funds: Funds available from a pooled depositor group for a short-term deposit or a specific transaction. A different rate may be negotiated for each transaction.
11. Term funds: Funds available from a pooled depositor group offered to investment entities that need money for specified terms, such as 30 days, 60 days, 90 days, or 120 days. Conventionally, such funds have gone into CDs. However, community banks can pay higher rates for these funds because they are instant and avoid going to the brokerage CD market. Rates may be negotiated on individual transactions.

As indicated above, the custodian's duties are to hold assets on behalf of pooled depositor groups and commercial banks. In addition custodians may have the following duties:

1. Establish a custody account for the control center in which the following transactions will be reflected.
2. Within the custody account, establish an asset record for each commercial bank master NOW account. The asset amount will reflect the total deposit by all depositors in each NOW account. The control center will provide instructions regarding the setup of new NOW accounts within a reasonable period of time prior to the funding of particular NOW accounts.
3. Receive funds transfers, such as federal wire transfers and automated clearing house transfers, on a daily basis from various depositors who have signed agreements with the control center. The funds must be received within a reasonable period of time to be invested on the same day.
4. In conjunction with each incoming wire, accept written direction from the control center (e.g., by fax or e-mail) with regard to the application of funds. Direction must be received within a reasonable period of time for same-day deposit and will include the amount to be received and the name of the bank to which funds will be wired (for deposit-purchase into the selected NOW account). If volumes increase dramatically, the deadline for directions may be changed to an earlier time.
5. Wire funds received within a reasonable period of time from depositors to various commercial banks on a daily basis, as instructed by the control center, before the close of business on the day the funds are received.
6. Reconcile holdings in the custody account to statements received from NOW account issuers (commercial banks).
7. As earnings are added to NOW accounts each month, post the addition of those earnings to each NOW account held in the custody account in order to bring the custody account holdings current with issuing commercial bank records.
8. As depositors request funds, withdraw principal from various NOW accounts on a daily basis (e.g., via funds wires) as instructed by the control center.
9. Wire withdrawn monies back to depositors on a daily basis as instructed by the control center.
10. Once a month, receive by wire an earnings spread on the NOW accounts from each issuing commercial bank and wire to the control center the earnings spread minus the custodian fee. The earnings spread will be determined on each NOW account by the control center. The control center may choose a different method for distribution: the earnings spread may be wired directly to the control center by the issuing commercial bank, rather than through the custodian. If this method of payment is chosen, the custodian will send a monthly invoice to the control center, which will be paid within 30 days of receipt.

Accordingly, it is an object of the invention to provide improved methods and systems for facilitating transactions between commercial banks and pooled depositor groups.

It is another object of the invention to provide a short-term liquid deposit vehicle for pooled depositor groups that is fully FDIC insured up to $100,000 or is collateralized from any single individual within a pooled depositor group.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which:

FIG. 10 is a block diagram illustrating an exemplary business rules screen for a pooled depositor group in that may be associated with a system for facilitating transactions between commercial banks and pooled depositor groups according to an embodiment of the present invention;

FIG. 16 is a block diagram of an exemplary business rules screen for a commercial bank in a system for facilitating transactions between commercial banks and pooled depositor groups according to an embodiment of the present invention;

DETAILED DESCRIPTION OF THE INVENTION

Figure 1:
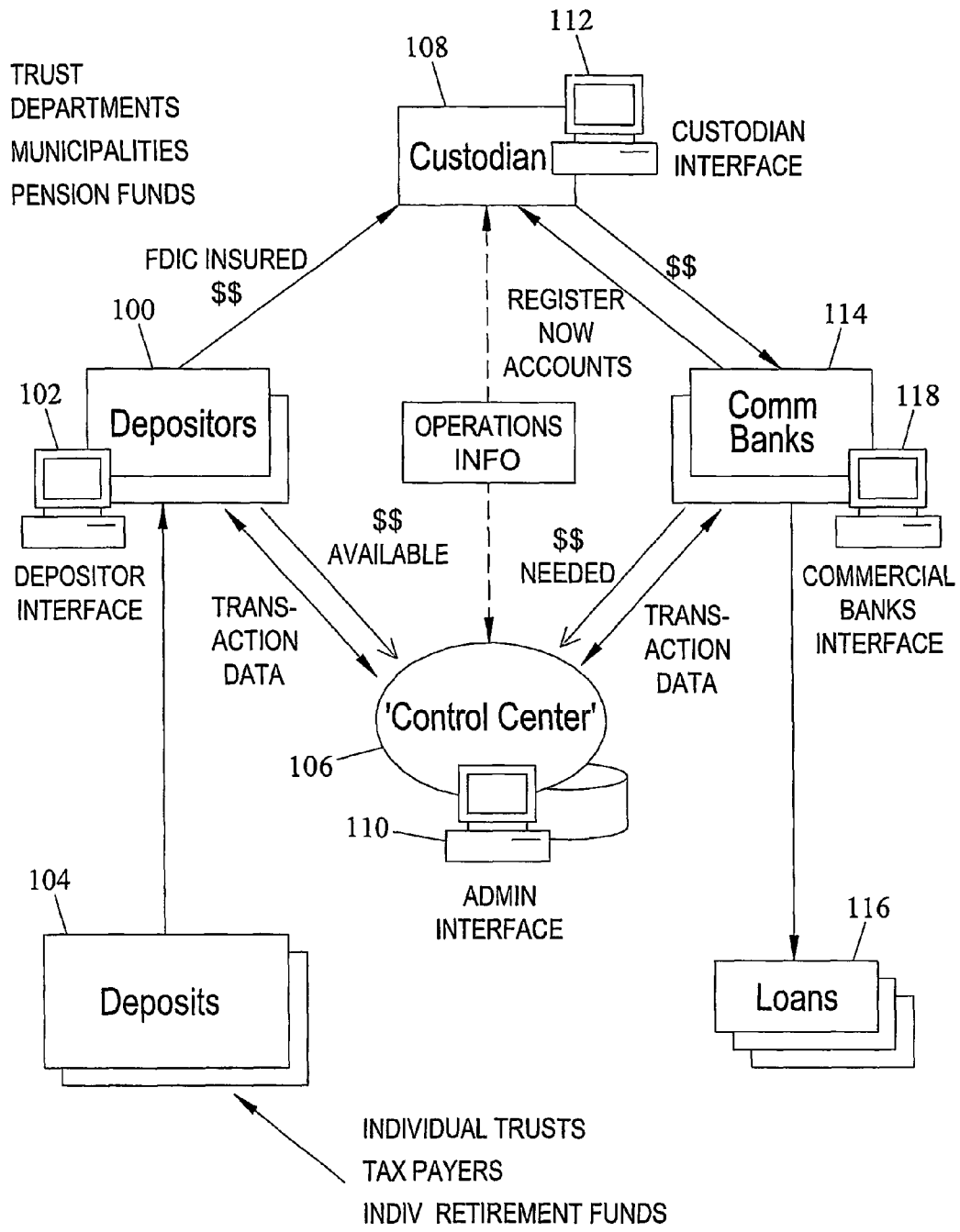
FIG. 1 is a block diagram of a system for facilitating financial transaction between commercial banks and pooled depositor groups according to an embodiment of the present invention.

FIG. 1 illustrates a system for facilitating transactions between commercial banks and pooled depositor groups according to an embodiment of the present invention. In FIG. 1, block 100 represents pooled depositor groups that have available cash to invest in insured, liquid deposit opportunities. A depositor interface 102 is provided for these groups to access insured, liquid deposit opportunities created based on cash needed by commercial banks for core deposits. The cash that pooled depositor groups 100 have available for deposit may originate from deposits, represented by block 104. The deposits may be from individual trusts, taxpayers, retirement funds, or other suitable cash source.

A custodian 108 may be provided as a trusted intermediary through which pooled depositor groups 100 may make their deposit cash available. In one example, custodian 108 may be a known financial institution, such as a national bank. However, the present invention is not limited to using a custodian to facilitate transactions between commercial banks and pooled depositor groups. In one implementation, custodian 108 may be omitted and control center 106 may function as a custodian for the commercial banks and the pooled depositor groups.

In the illustrated example, both control center 106 and custodian 108 include software interfaces 110 and 112. Software interface 110 at control center 106 allows control center 110 to view transactions made through custodian 108. Custodian interface 112 allows custodian 108 to view accounts and transfer cash to and from the accounts.

On the right hand side of the diagram, commercial banks 114 may need cash for core deposits to cover loans 116. Alternatively, or in addition, banks 114 may need term funds or hot funds. In order to obtain needed funds, banks 114 register with control center 106 and post master NOW accounts with custodian 108. Commercial banks software interface 118 allows banks to post to master NOW accounts and notifies banks 114 of the interest rate to be paid on cash obtained by banks 114 from custodian 108. In order to provide an insured, liquid deposit opportunity for depositors 100 and cash to banks 114, an interest rate that is attractive to both depositors 100 and commercial banks 114 must be determined. In a preferred embodiment of the invention, depositors 100 are offered a first interest rate, and commercial banks pay a second interest rate, where the second interest rate is higher than the first interest rate. The owners of control center 106 may be able to obtain favorable interest rates from commercial banks 114 by aggregating cash from multiple pooled depositor groups. Based on the difference in interest rates, the owners of control center 106 may fund operations and preferably make a profit. Once the interest rates are set, control center 106 communicates the first interest rate to depositors 100 via depositor interface 102 and communicates the second interest rate to banks 114 via commercial banks interface 118. Both interest rates are preferably guaranteed for a fixed term, such as one month. In addition, depositors 100 are preferably allowed to withdraw cash deposited without penalty in predetermined amounts at predetermined time intervals. For example, the cash deposited by depositors 100 may be made available without penalty to the depositors in denominations of $1 on a daily basis.

The present invention is not limited to offering different interest rates to depositors 100 than commercial banks 114 are willing to pay. In an alternate implementation of the invention, the rate offered by commercial banks 114 may be the same rate that is provided to depositors 100. In return for providing access to aggregate depositors 100, commercial banks 114 may pay the owners of control center 114 a predetermined commission or fee. Thus, by facilitating transactions between depositors and commercial banks, control centers 106 may be able to provide better interest rates on deposits, provide cash to commercial banks, and may do so in a manner that earns a profit.

Because the software illustrated in FIG. 1 provides a convenient deposit vehicle for commercial banks to obtain stable money for core deposits and term funds, commercial banks 114 can reduce their percentages of brokered deposits and thereby increase the likelihood of a favorable regulatory rating. In addition, the system and software illustrated in FIG. 1 provides a convenient liquid deposit opportunity for depositors. Thus, the system illustrated in FIG. 1 facilitates transactions between commercial banks and pooled depositor groups.

Figure 2:
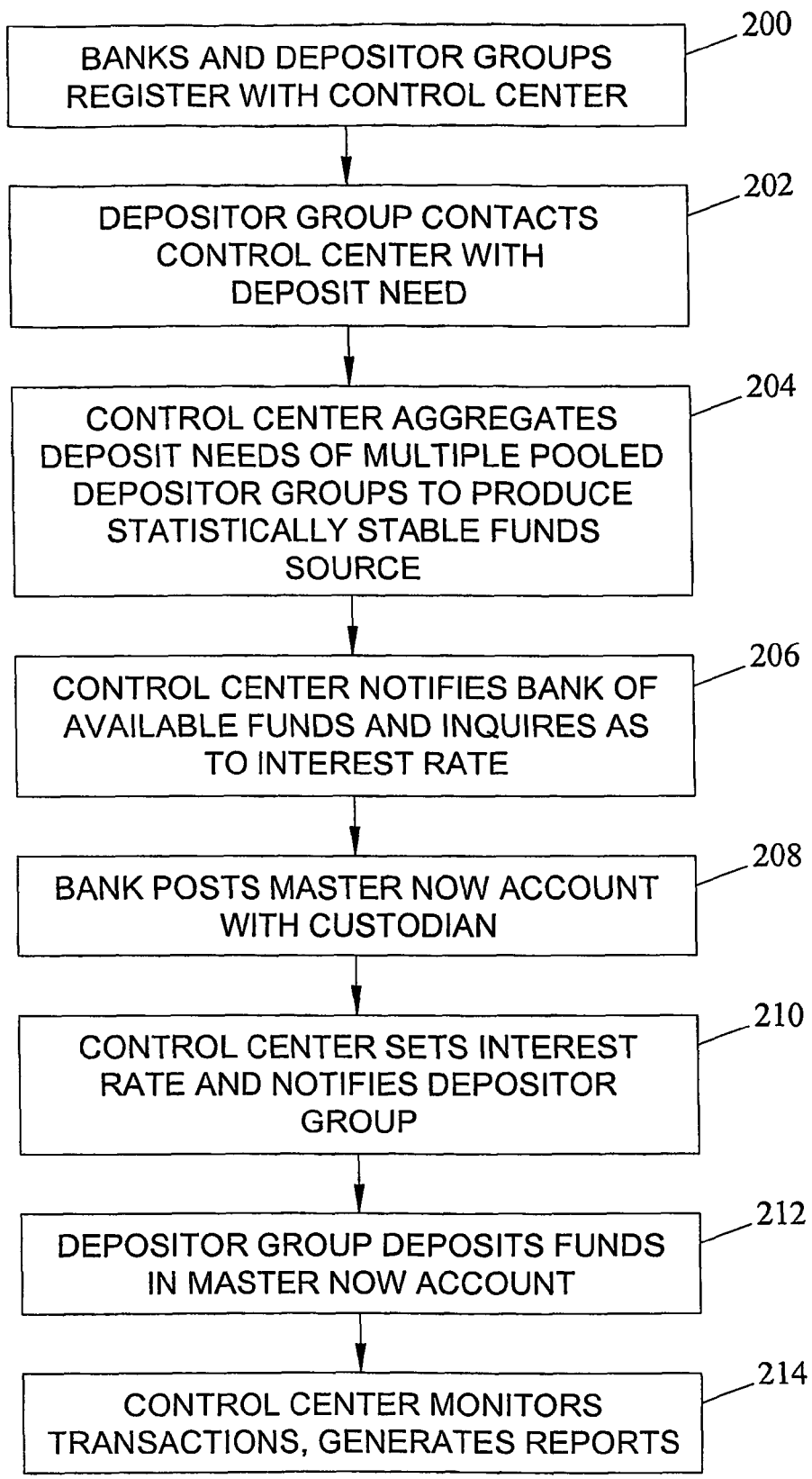
FIG. 2 is a flow chart illustrating exemplary steps for facilitating transactions between commercial banks and pooled depositor groups according to an embodiment of the present invention.

FIG. 2 is a flow chart illustrating exemplary steps that may be performed by control center 106 in facilitating transactions between commercial banks and pooled depositor groups according to an embodiment of the present invention. Referring to FIG. 2, in step 200, banks and depositor groups register with control center 106. For the banks, the registration may include qualifying as a commercial bank in accordance with predetermined standards, such as federal or state regulatory standards. For pooled depositor groups 100, registration may also include qualifying as an entity permitted to make deposits in a NOW account and guaranteeing a predetermined amount of deposit cash.

After registration, a pooled depositor group 100 may contact control center 106 with a deposit need. For example, pooled depositor group 100 may indicate to control center 106 that depositor group 100 desires to deposit $10 million, wants a return of 2%, and desires for individual depositors to be able to access the money on a daily basis. Step 202 may occur multiple times as the operators of control center 106 determine available cash from different pooled depositor groups.

In step 204, control center 106 aggregates the deposit needs of multiple pooled depositor groups to produce a stable funds source. As discussed above, providing a stable funds source to commercial banks is important so that the commercial banks can consider the funds core deposits. In step 206, control center 106 notifies commercial banks of the amount of money available, and inquires as to the interest rate that the banks are willing to pay for the money. For example, a bank may agree to pay 235 basis points for $10 million, where basis point is equal to one one-hundredth of one percent. In step 208, banks 114 post master NOW accounts with custodian 108. In step 210, control center 106 sets the interest rate to be paid to the pooled depositor group lower than rate that the bank is willing to pay and at or above the rate that the pooled depositor group expects and notifies the depositor group of the availability of a NOW account at the interest rate. Continuing with the example, if the depositor group expects 200 basis points, control center 106 may set the interest rate to be paid to the trust department to at least 200 basis points. Since the bank is willing to pay 235 basis points, control center 106 can generate up to 35 basis points in revenue.

In step 212, the depositor group deposits funds with custodian 108. Custodian 108 places the funds in one or more master NOW accounts in accordance with instructions from control center 106. In step 214, control center 106 manages transactions and generates reports to both the depositor group 100 and commercial banks 114. Managing transactions may include providing wiring instructions to depositor 100, custodian 108, and banks 114. In addition, managing transactions may include providing sub-accounting information to custodian 108 regarding individual depositors in a pooled depositor group so that individual depositors' deposits can be FDIC insured. Managing transactions may also include collecting interest paid by commercial banks 114 and distributing the interest to depositors. Yet another aspect of managing the transactions may include coordinating withdrawals made by depositors 100 in a manner that reduces transactions and wiring expenses. Two methods for coordinating withdrawals will be described in detail below.

Because the money is deposited in master NOW accounts, pooled depositor groups are allowed to withdraw funds without penalty on a daily basis. Thus, the invention provides an advantage to depositor groups over conventional certificates of deposit.

Although the example described above relates primarily to banks posting master NOW accounts, the present invention is not limited to using master NOW accounts. For example, corporations are not permitted to deposit money in master NOW accounts. Accordingly, receiving money from corporations and having commercial banks post accounts that are equivalent to master NOW accounts in which corporations are permitted to deposit cash is intended to be within the scope of the invention. In one exemplary implementation, in order to receive deposits from corporations, the present invention may include using a money market deposit account (MMDA) account. Thus, although the examples described herein relate to master NOW accounts, it is understood that MMDA accounts may be used without departing from the scope of the invention.

Figure 3:
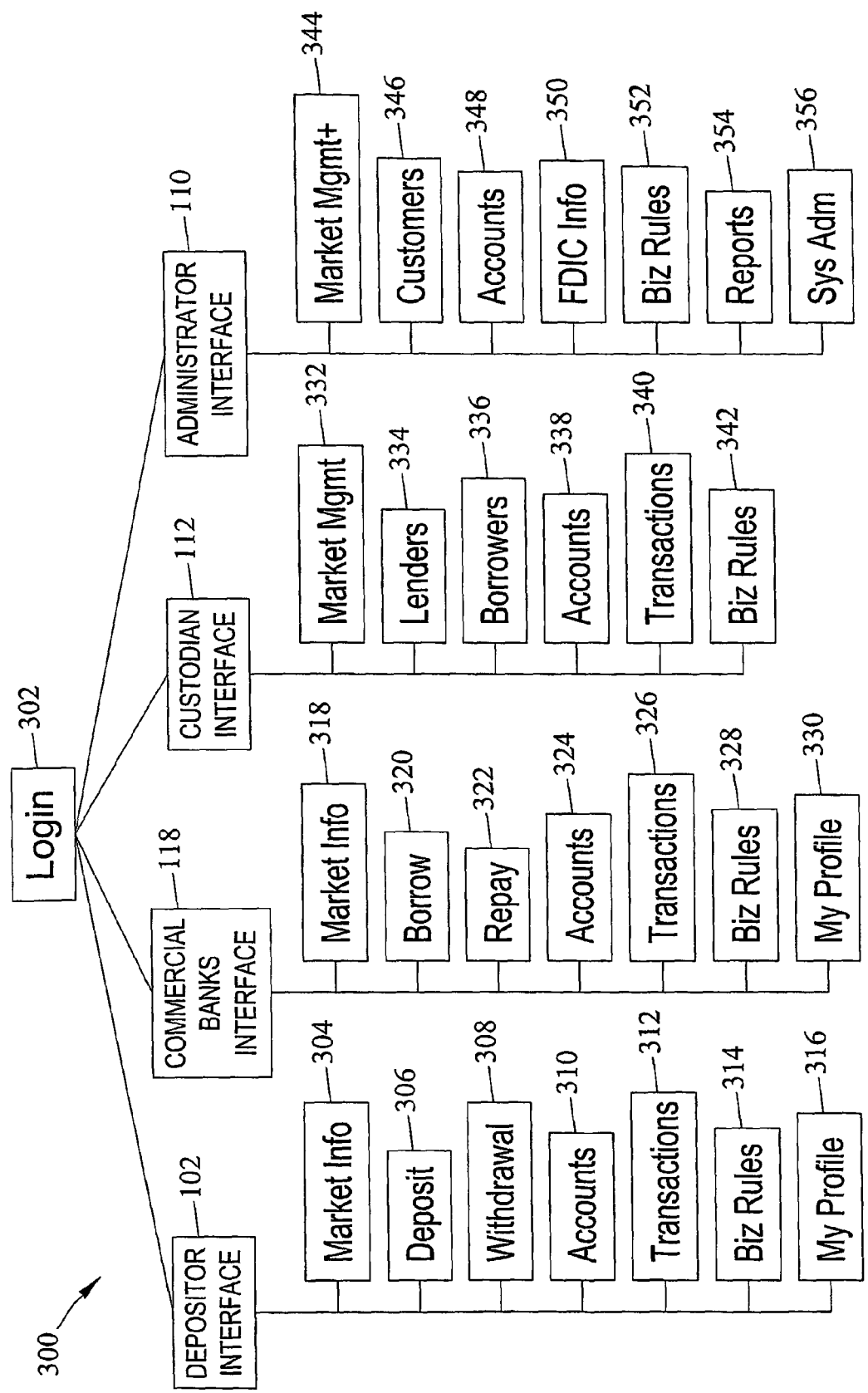
FIG. 3 is a tree diagram illustrating an exemplary web site map for a system for facilitating transactions between commercial banks and pooled depositor groups according to an embodiment of the present invention.

In one exemplary implementation, a system for facilitating transactions between commercial banks and pooled depositor groups may be implemented using a web server that provides the interfaces illustrated in FIG. 1. Such a web server may be implemented using any suitable commercially available web server platform, such as an Apache web server. Each interface illustrated in FIG. 1 may be implemented as an application capable of executing on such a platform. FIG. 3 is a tree diagram illustrating an exemplary website map for a web implemented system for facilitating transactions between commercial banks and pooled depositor groups according to an embodiment of the present invention. Referring to FIG. 3, an exemplary website map 300 includes a login screen 302 that provides access to interfaces 102, 110, 112, and 118 illustrated in FIG. 1. Each interface may include a series of computer screens or web pages tailored to the functionality provided by the interface. In the illustrated example, pooled depositor group interface 102 includes a market information page 304, a deposit page 306, a withdrawal page 308, an accounts page 310, a transactions page 312, a business rules page 314, and a profile page 316. Each of the pages 304-316 are preferably tailored to allow pooled depositor groups to obtain rate information provided by commercial banks, deposit money in master NOW accounts, withdraw money from the master NOW accounts on a daily basis, and view transaction information.

Commercial banks interface 118 includes a market information page 318, a borrow page 320, a repay page 322, an accounts page 324, a transactions page 326, a business rules page 328, and a profile page 330. Pages 318-330 are preferably tailored to allow a commercial bank to post master NOW accounts, to view the status of master NOW accounts, to repay obligations on master NOW accounts, and to perform other actions related to obtaining deposit cash from pooled depositor groups.

Custodian interface 112 includes a market management page 332, a lenders page 334, a borrowers page 336, an accounts page 338, a transactions page 340, and a business rules page 342. Pages 332-342 are preferably tailored to allow a custodian to manage transactions between commercial banks and pooled depositor groups.

Administrator interface 110 includes a market management page 344, a customers page 346, an accounts page 348, an FDIC information page 350, a business rules page 352, a reports page 354, and a system administration page 356. Pages 344-356 are preferably structured to allow administrator interface 110 to control transactions between pooled depositor groups and commercial banks. Each of the web pages illustrated in FIG. 3 will now be described in further detail.

Figure 4:
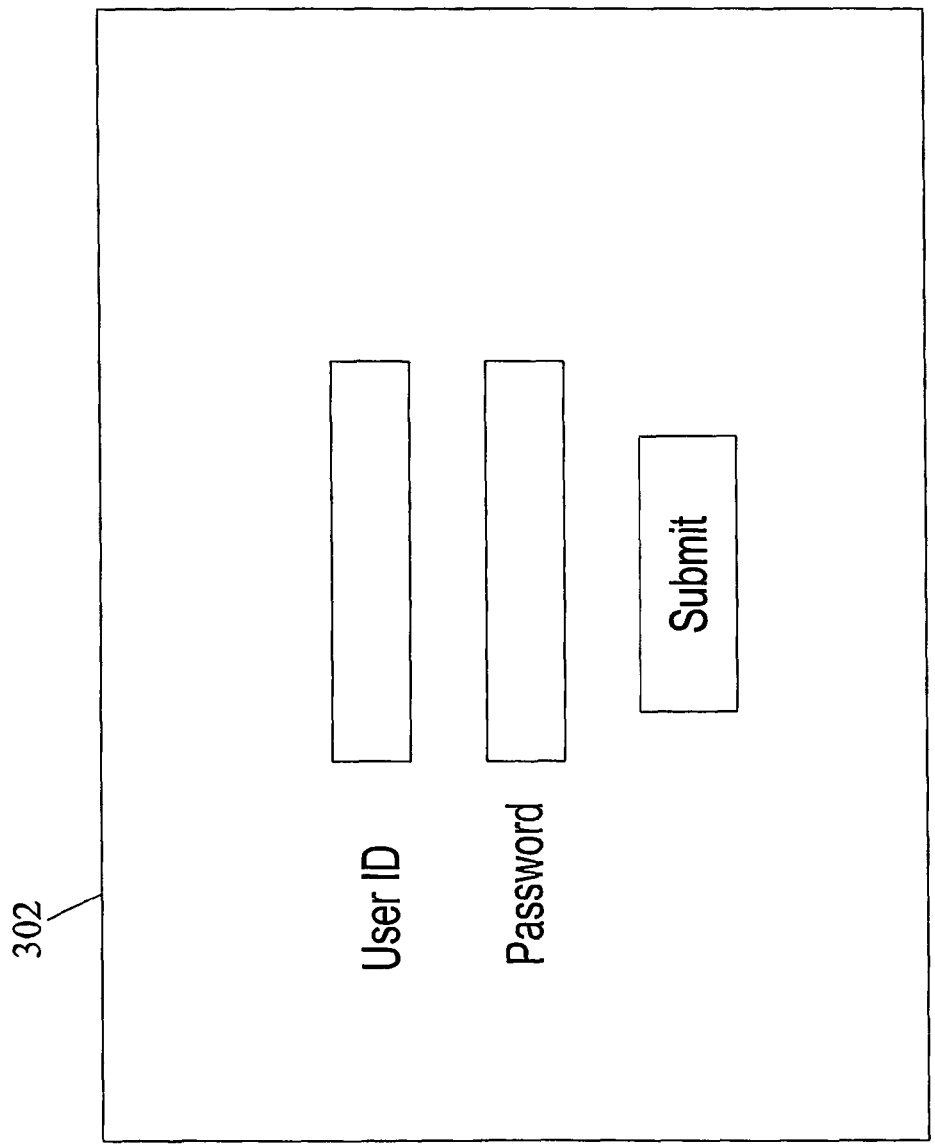
FIG. 4 is block diagram of an exemplary login screen of a system for facilitating transactions between commercial banks and pooled depositor groups according to an embodiment of the present invention.

FIG. 4 illustrates an example of a login screen 302. In the example login screen, a user is requested to enter a user ID and a password. Based on the user ID and the password, the user will be directed to the appropriate interface 102, 110, 112, or 118.

Figure 5:
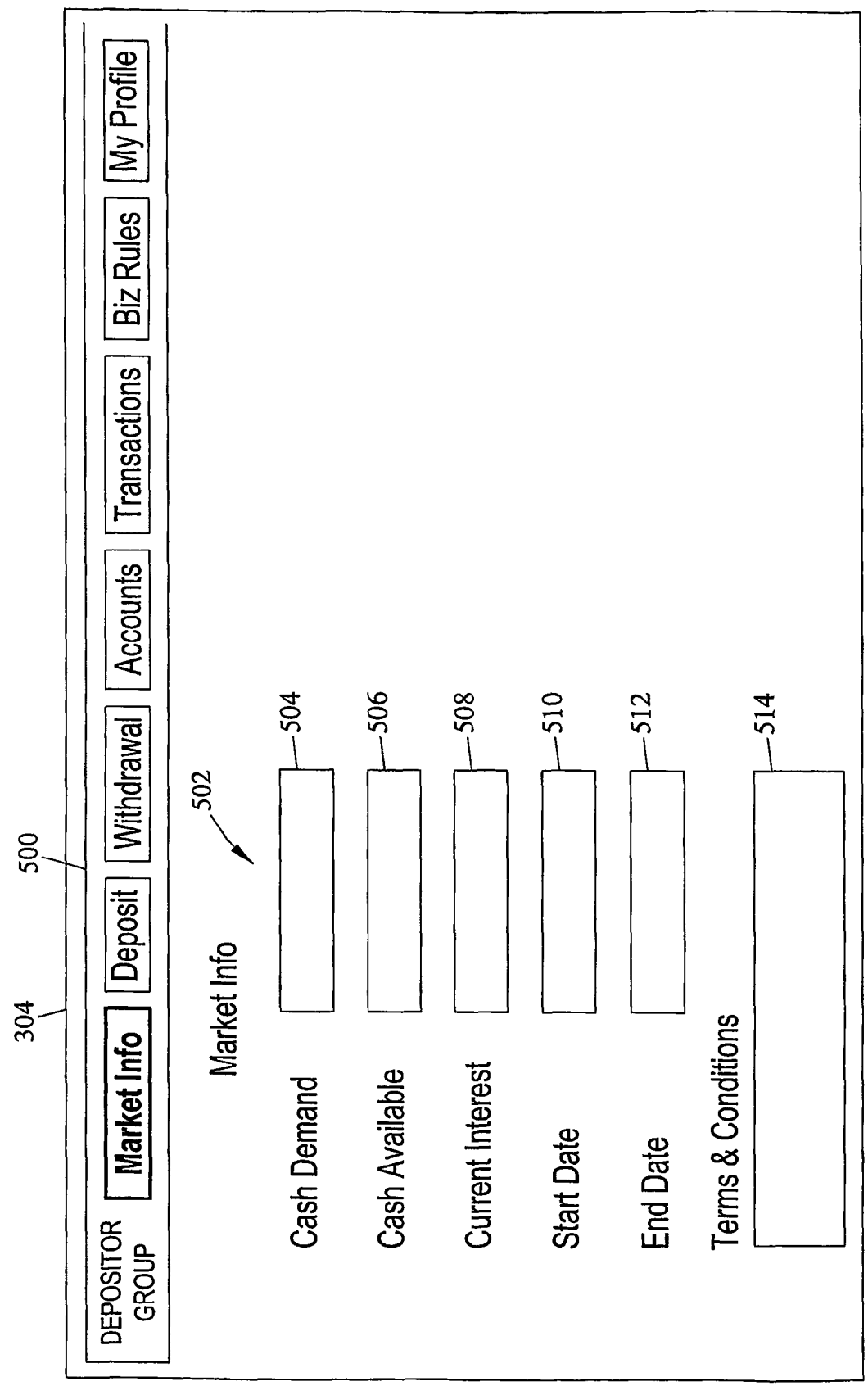
FIG. 5 is a block diagram illustrating an exemplary market information screen for a pooled depositor group in a system for facilitating transactions between commercial banks and pooled depositor groups according to an embodiment of the present invention.

FIG. 5 illustrates an example of market information page 304 for a pooled depositor group. In the illustrated example, web page 304 includes a toolbar 500 that allows a pooled depositor group to access other pages associated with pooled depositor group interface 102. In the illustrated example, pooled depositor group interface 304 includes a market information section including market information of interest to a pooled depositor group. In the illustrated example, market information section 502 includes a cash demand field 504, a cash available field 506, a current interest rate field 508, a start date field 510, an end date field 512, and a terms and conditions field 514. Cash demand field 504 stores demand for cash by commercial banks 114. This number may be updated by control center 106 on a daily basis based on demand received from commercial banks. Cash available field 506 may display cash available from the particular pooled depositor group. Current interest rate field 508 may display the current interest rate to be paid to the pooled depositor group set by control center 106. Start and end date fields 510 and 512 may display the start and end dates at which the current interest rate is available. Finally, terms and conditions field 514 may store terms and conditions associated with payback of the funds.

Figure 6:
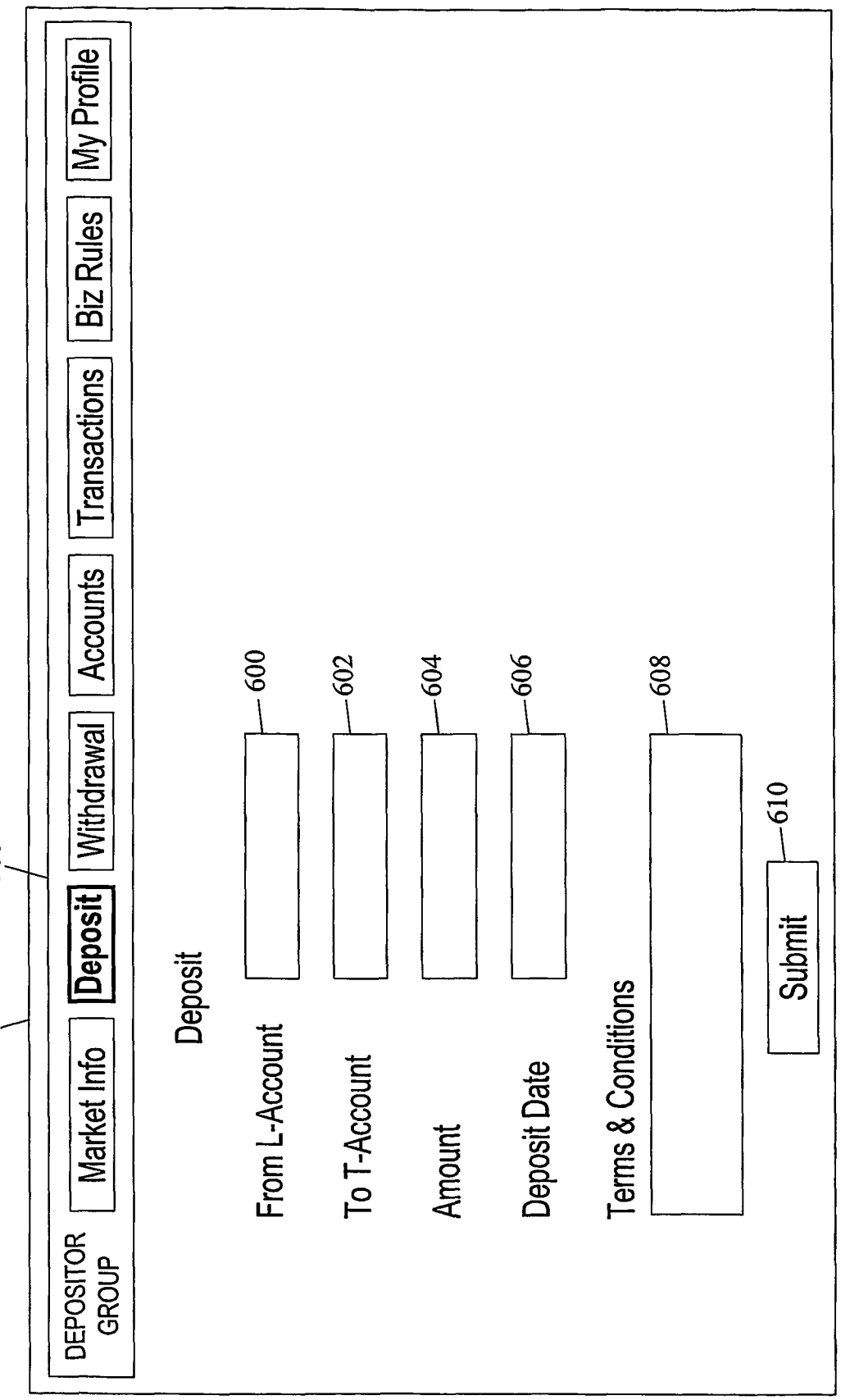
FIG. 6 is a block diagram illustrating an exemplary deposit screen for a pooled depositor group in a system for facilitating transactions between commercial banks and pooled depositor groups according to an embodiment of the present invention.

FIG. 6 illustrates an example of a deposit page 306 that may be displayed to a pooled depositor group. In the illustrated example, deposit page 306 includes various fields that allow a pooled depositor group to make a deposit. These fields may include a from account field 600, a to account field 602, an amount field 604, a deposit date field 606, a terms and conditions field 608, and a submit button 610. From account field 600 is an input field that allows a pooled depositor group to indicate an account from which a deposit is authorized. To account field 602 may indicate master NOW accounts issued by various pooled depositor groups. Amount field 604 may store an amount that a pooled depositor group desires to withdraw from an account and deposit in a master NOW account. Deposit date field 606 is an input field that allows a depositor to input a date on which a deposit is to occur. Terms and conditions field 608 may display terms and conditions associated with the transaction. Finally, support button 610 may initiate functionality for depositing the funds in an account associated with a commercial bank.

Figure 7:
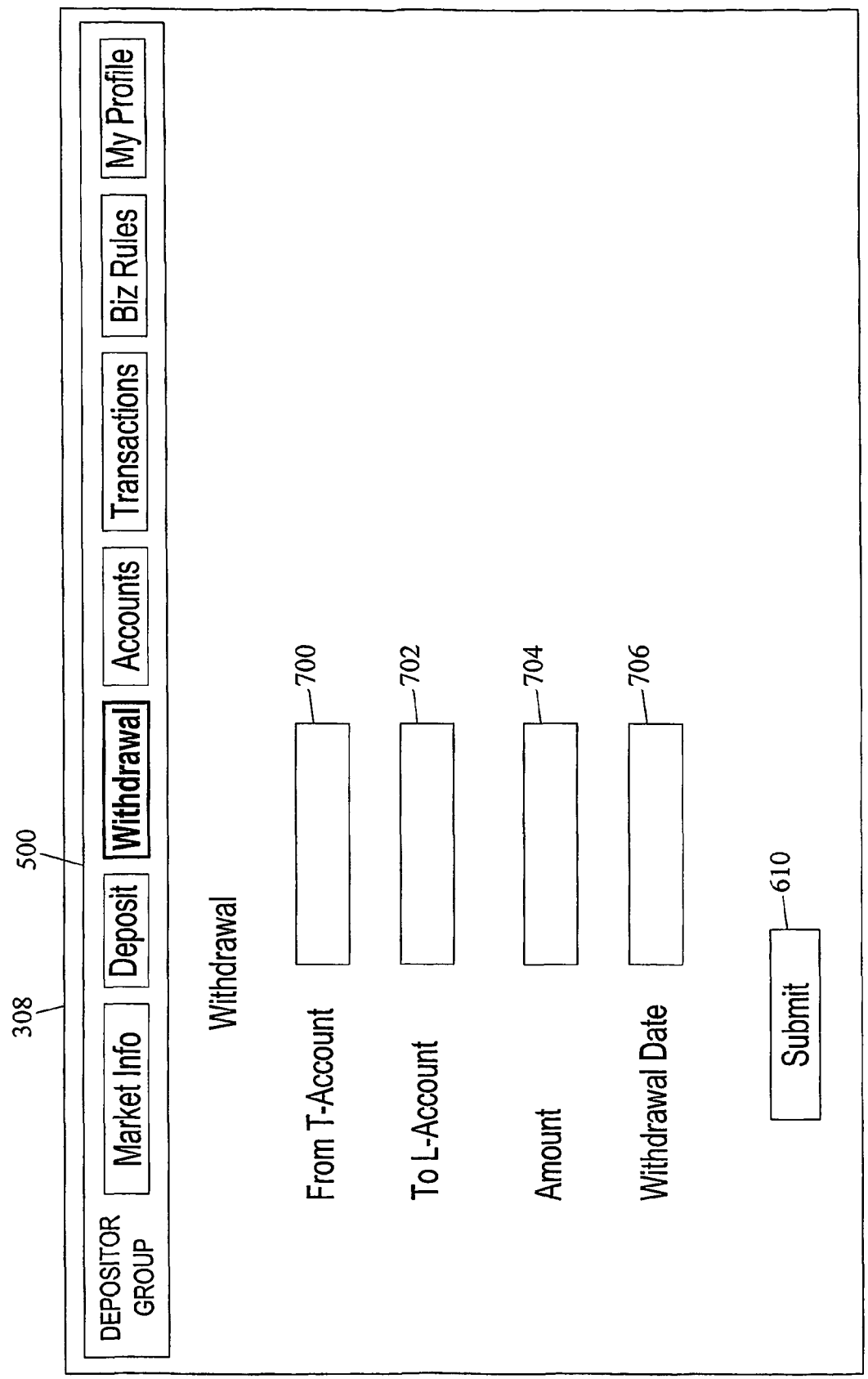
FIG. 7 is a block diagram of an exemplary withdrawal screen for a pooled depositor group in a system for facilitating transactions between commercial banks and pooled depositor groups according to an embodiment of the present invention.

FIG. 7 illustrates an exemplary withdrawal page 308 associated with pooled depositor group interface 102. In the illustrated example, withdrawal page 308 includes various fields for allowing a pooled depositor group to withdraw money from an account with custodian 108. These fields may include a from account field 700, a to account field 702, an amount field 704, a withdrawal date field 706, and a submit button 610. From account field 700 allows a pooled depositor group to specify an account with custodian 108 from which funds are to withdrawn. To account field 702 allows a pooled depositor group to specify an account to which the funds are to be deposited. Amount field 704 specifies an amount of the withdrawal. Withdrawal date field 706 allows the pooled depositor group to specify a withdrawal date for the funds. Submit button 610 allows the pooled depositor group to initiate steps to complete the transaction. As discussed above, funds deposited in master NOW accounts are preferably accessible by pooled depositor groups on a daily basis without penalty, thus providing liquidity advantages over conventional certificates of deposit.

Figure 8:
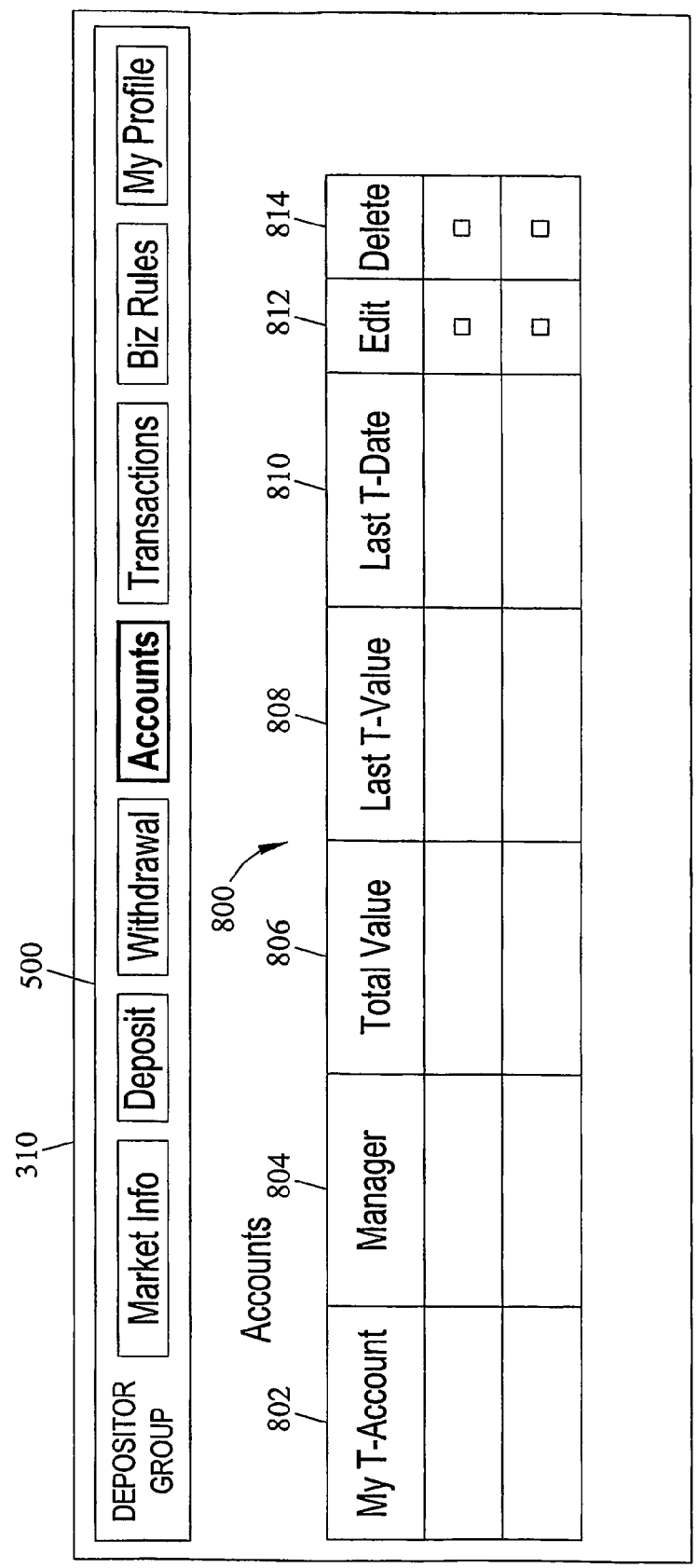
FIG. 8 is a block diagram illustrating an exemplary account screen for a pooled depositor group in a system for facilitating transactions between commercial banks and pooled depositor groups according to an embodiment of the present invention.

FIG. 8 illustrates an example of an accounts page 310 associated with pooled depositor group interface 102. In FIG. 8, accounts page 310 includes an accounts data section 800 that stores date regarding accounts of a pooled depositor group. In FIG. 8, accounts data section 310 includes an account field 802, a manager field 804, a total value field 806, a last value field 808, a last date field 810, an edit field 812, and a delete field 814. Account field 802 may identify accounts of a pooled depositor group. Manager field 804 may indicate the custodian managing the account. Total value field may indicate the total value of the account. Last value field 808 may indicate the last value of the account on a particular date. Last date field 810 may indicate the date on which the last value was provided. Finally, edit and delete fields 812 and 814 may allow the depositor group to edit or delete information in accounts section 800.

Figure 9:
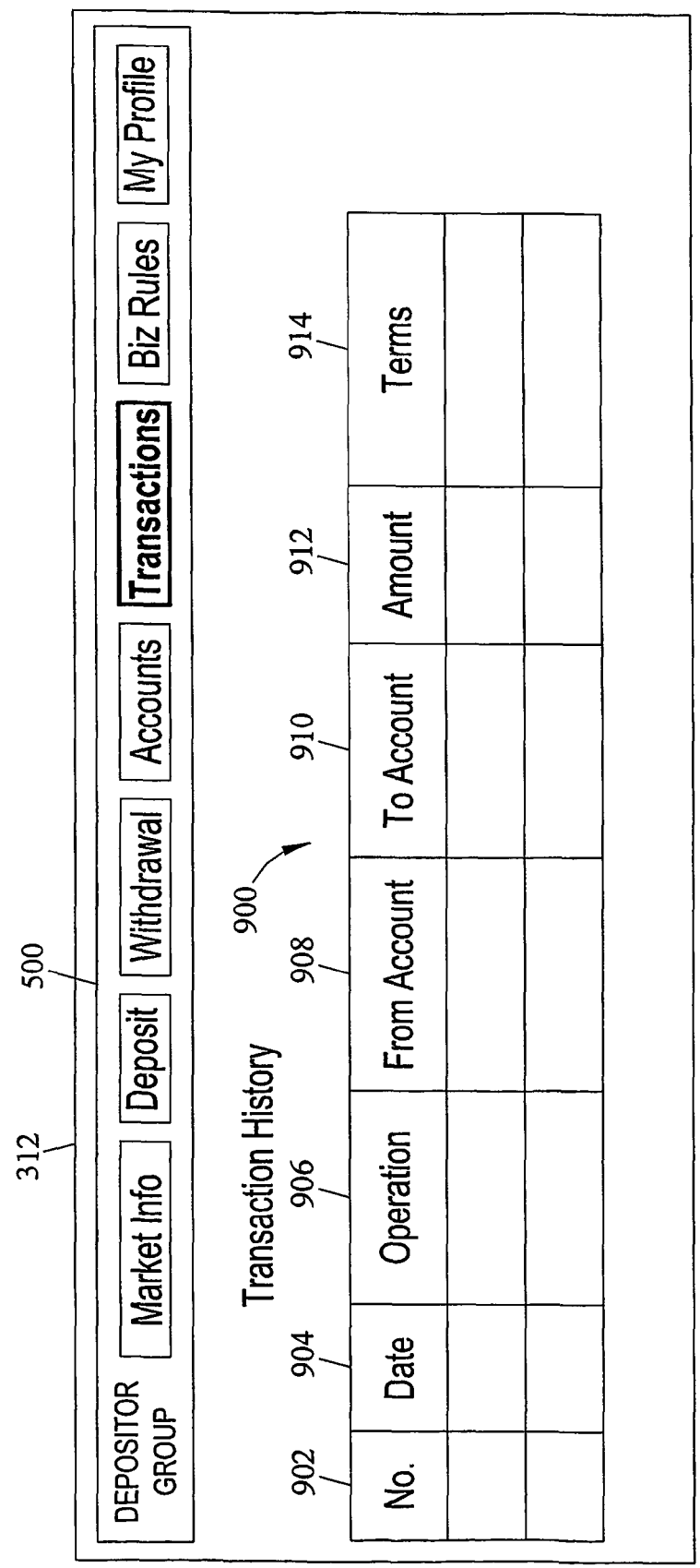
FIG. 9 is a block diagram illustrating an exemplary transaction screen for a pooled depositor group in a system for facilitating transactions between commercial banks and pooled depositor groups according to an embodiment of the present invention.

FIG. 9 illustrates an example of a transactions page 312 associated with pooled depositor group interface 102. In the illustrated example, transactions page 312 includes a transaction history section 900 that stores a history of deposits and withdrawals made by the pooled depositor group. In the illustrated example, transaction history section includes a number field 902, a date field 904, an operation field 906, a from account field 908, a to account field 910, an amount field 912, and a terms field 914. Number field 902 may store a transaction number for a particular transaction of a pooled depositor group. Date field 904 may store the date of the transaction. Operation field 906 may store the type of transaction, i.e., whether the transaction was a deposit or a withdrawal. From account field 908 specifies the account of the pooled depositor group from which funds were withdrawn. To account field 910 stores the master NOW account to which funds were deposited. Amount field 912 stores the amount of the transaction. Finally, terms field 914 may display terms associated with the transaction, such as the interest rate or the time period for the deposit.

FIG. 10 illustrates an exemplary business rules page 314 associated with pooled depositor group interface 102. In the illustrated example, business rules page 314 includes a business rules section 1000 that stores business rules of a pooled depositor group. Examples of business rules that may be stored in business rules section 1000 include a type or rating status of banks that the commercial pooled depositor group that the depositor group would be willing to deposit funds and whether or not to re-deposit proceeds. These rules may be used by control center 106 when determining the aggregate money supply available to a particular bank. For example, different amounts of funds may be made available to different banks depending on the banks' relative regulatory ratings.

Figure 11:
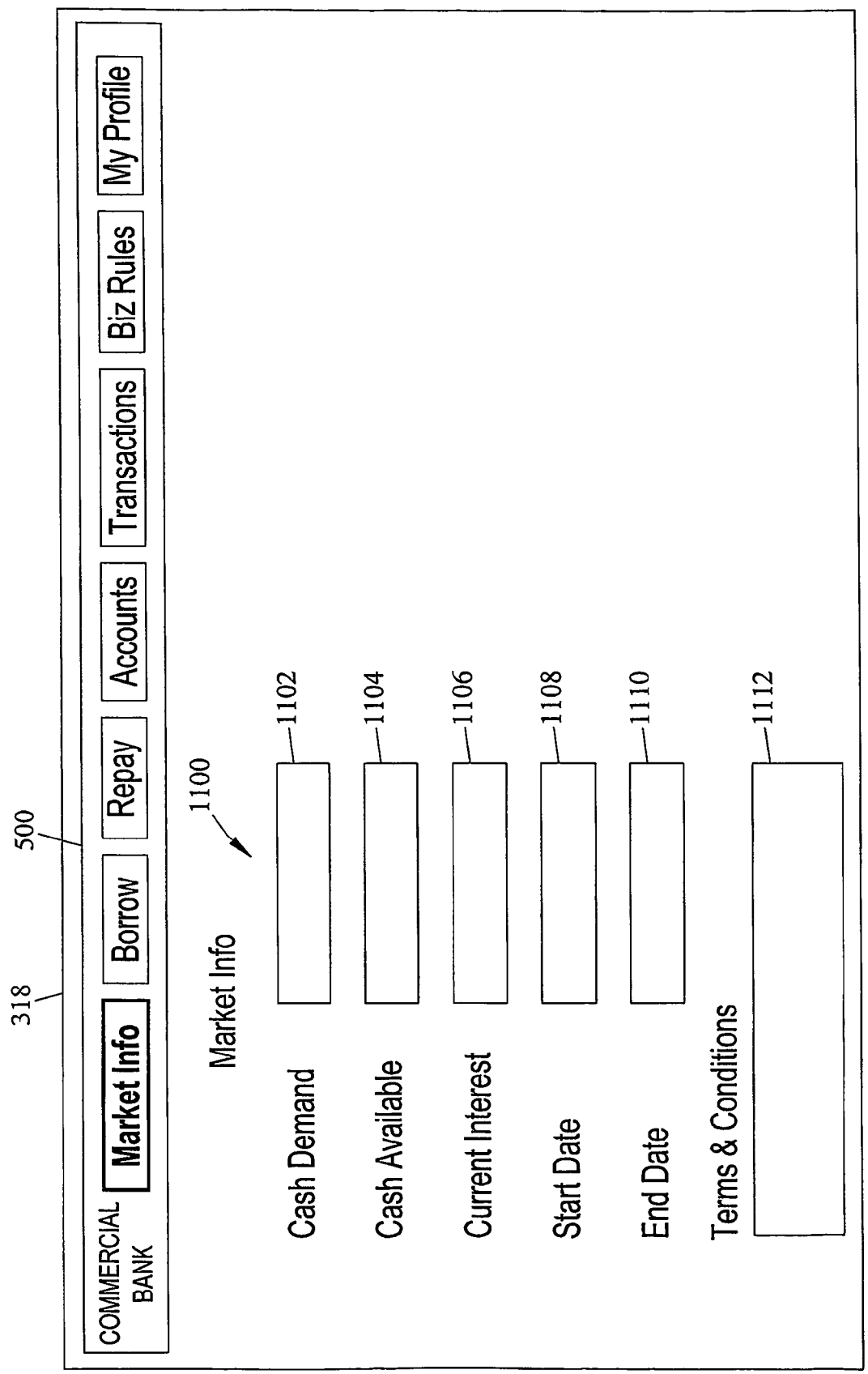
FIG. 11 is a block diagram of an exemplary market information screen for a commercial bank in a system for facilitating transactions between commercial banks and pooled depositor groups according to an embodiment of the present invention.

FIG. 11 illustrates an example of a market information page 318 that may be associated with commercial bank interface 118. In the illustrated example, commercial banks market information page 318 includes the same fields described above with regard to the market information page 304 associated with pooled depositor group interface 102. In FIG. 11, these fields are renumbered 1102-1112. Fields 1102-1112 display to the commercial bank information regarding cash demand, available cash, current interest rate, start date and end date for the interest rate, and terms and conditions. As discussed above, the values for these fields may be set by control center 106. However, the interest rate displayed in current interest field 1106 of commercial bank market information page 318 is preferably different from that displayed in the corresponding field of market information page 304 of pooled depositor groups interface 102. As discussed above, the interest rates provided and displayed to pooled depositor groups and commercial banks may be set by the owners of control center 106.

Figure 12:
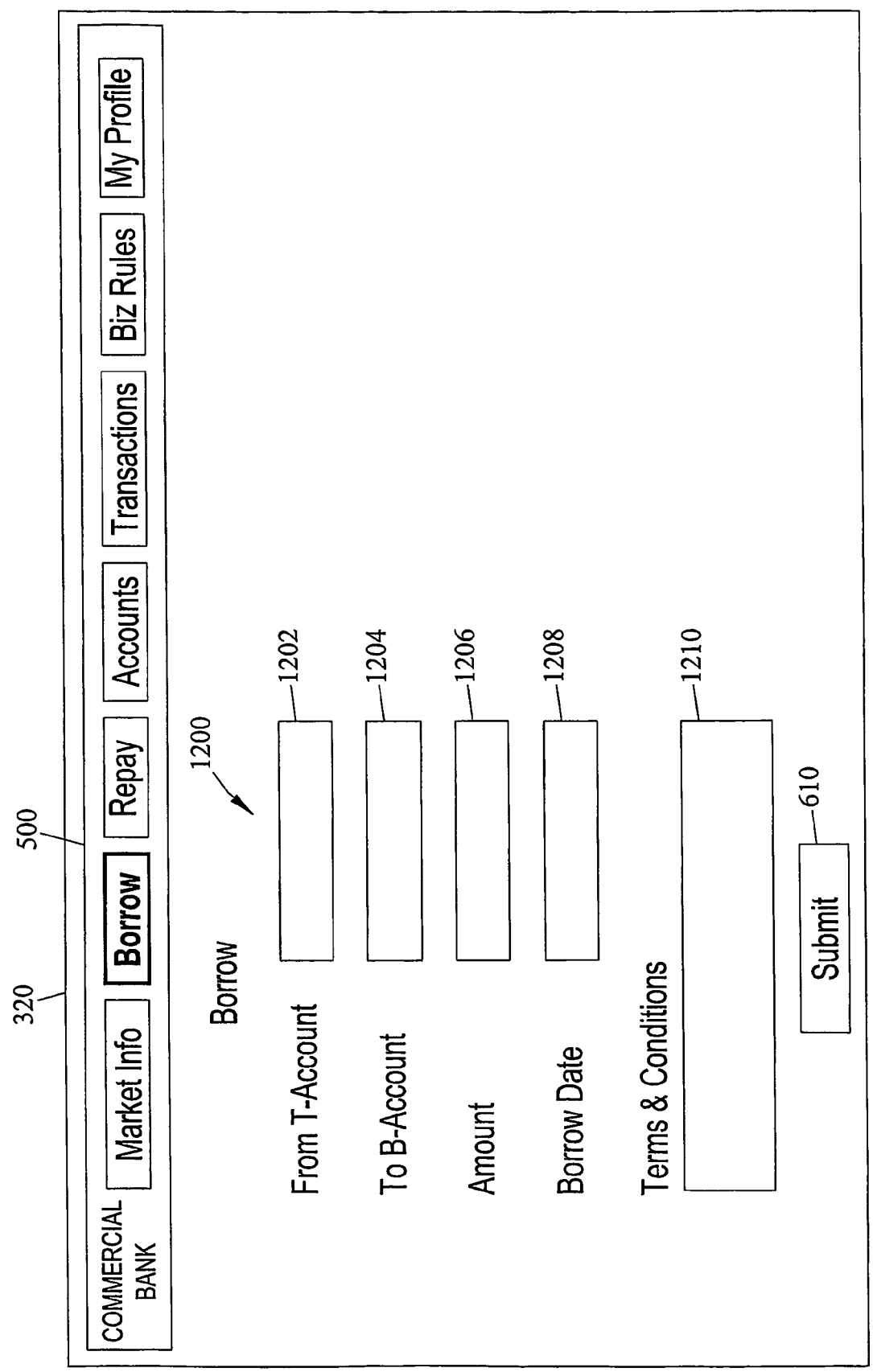
FIG. 12 is a block diagram illustrating an exemplary borrow screen for a commercial bank in a system for facilitating transactions between commercial banks and pooled depositor groups according to an embodiment of the present invention.

FIG. 12 illustrates an example of a borrow page 320 of commercial banks interface 118. In FIG. 12, borrow page 320 includes functionality for allowing a commercial bank to borrow money made available by pooled depositor groups 100. This functionality may be implemented in a plurality of input fields that receive data from the commercial bank and provide the data to control center 106. These fields may include a from account field 1202, a to account field 1204, an amount field 1206, a borrow date field 1208, a terms and conditions field 1210, and a submit button 610. A commercial bank uses from account field 1202 to specify a depositor group's account posted with custodian 108 from which the commercial bank desires to borrow money. To account field 1204 allows the commercial bank to specify a master NOW account into which the borrowed funds are to be received. Amount field 1206 is used to specify the amount that the commercial bank desires to borrow. The commercial bank uses borrow date field 1208 to specify the date on which the funds are to be borrowed. Terms and conditions field 1210 specifies the terms and conditions of the transaction. Finally, submit button 610 initiates a borrow transaction.

Figure 13:
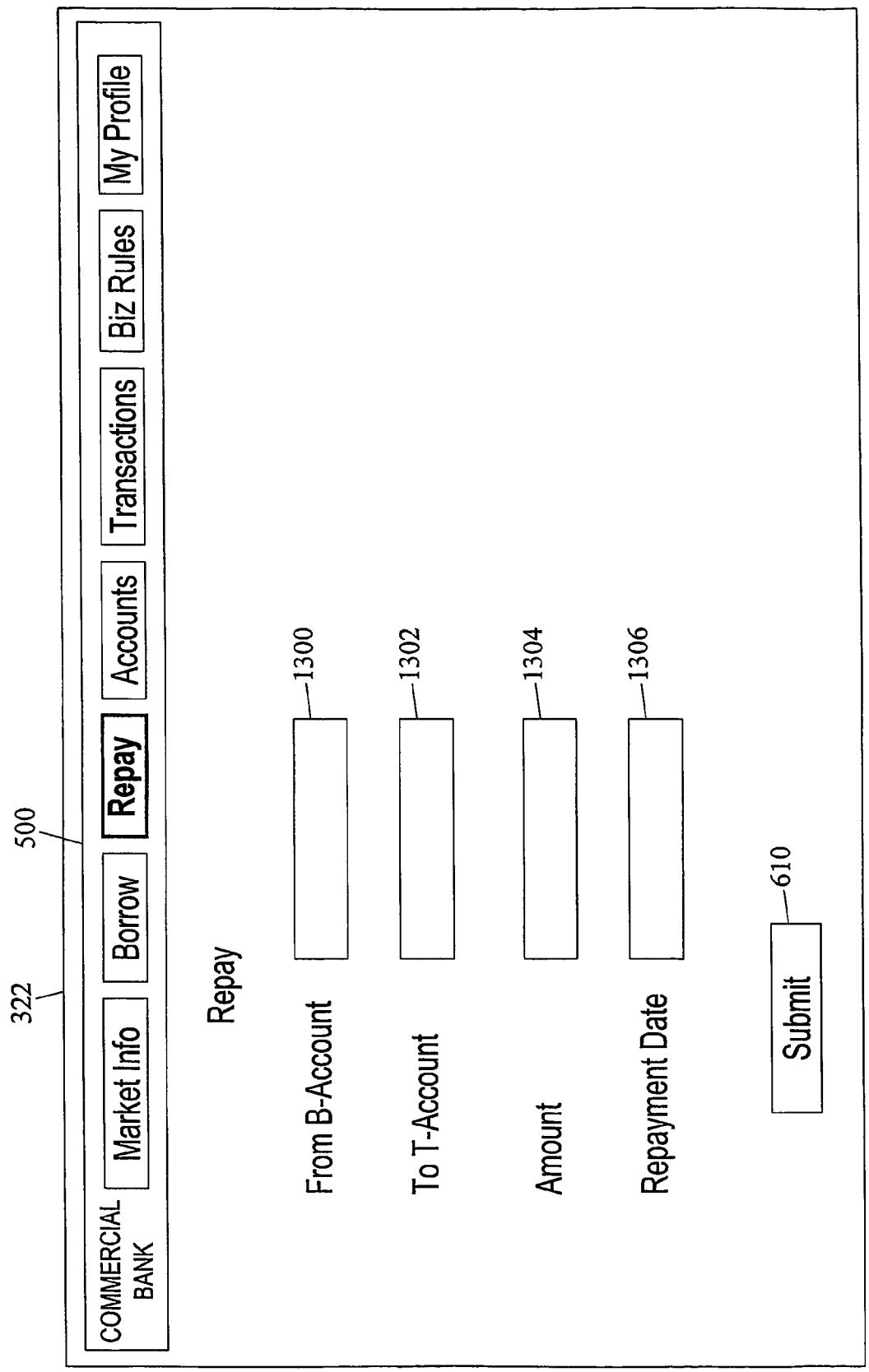
FIG. 13 is a block diagram illustrating an exemplary repay screen for a commercial bank in a system for facilitating transactions between commercial and pooled depositor groups according to an embodiment of the present invention.

FIG. 13 illustrates an exemplary repay page of commercial banks interface 118. Repay page 322 includes functionality for allowing a commercial bank to repay funds borrowed from a pooled depositor group. In the illustrated example, this functionality includes a from field 1300, a to field 1302, an amount field 1304, and a repayment date field 1306. From field 1302 allows a commercial bank to specify one of its accounts from which payment is to be withdrawn. To account field 1302 allows the commercial bank to specify a pooled depositor group account to which payment is to be made. Amount field 1304 allows the commercial bank to specify a repayment amount. Repayment date field 1306 allows the commercial bank to specify a date for making the repayment. Finally, submit button 610 initiates the repayment transaction.

Figure 14:
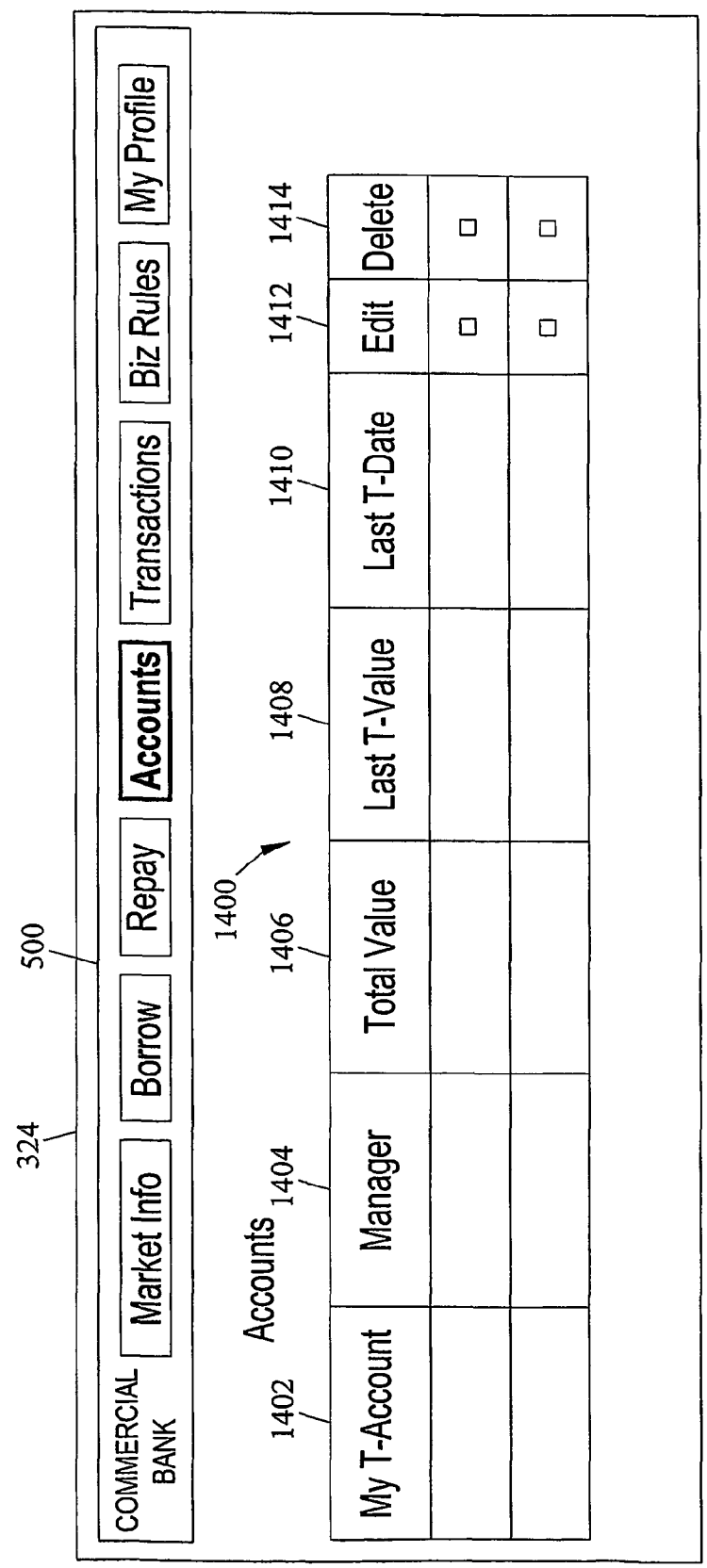
FIG. 14 is a block diagram illustrating an exemplary accounts screen for a commercial bank in a system for facilitating transactions between commercial banks and pooled depositor groups according to an embodiment of the present invention.

FIG. 14 illustrates an exemplary accounts page 324 of commercial banks interface 118. In the illustrated example, accounts page 324 includes an accounts table 1400 for providing information regarding a master NOW account posted by a commercial bank. In the illustrated example, accounts table 1400 includes an account field 1400, a manager field 1402, a total value field 1406, a last traded value field 1408, a last traded date field 1410, an edit field 1412, and a delete field 1414. Account field 1400 stores an account identifier such as an account number. Manager field 1404 displays the manager of the account. Total value field 1406 displays the current value of the account. Last value field 1408 displays the last traded value of the account. Last traded date field 1410 stores the last date on which the account was traded. Finally, edit and delete fields 1412 and 1414 allows the commercial bank to edit any of the account data.

Figure 15:
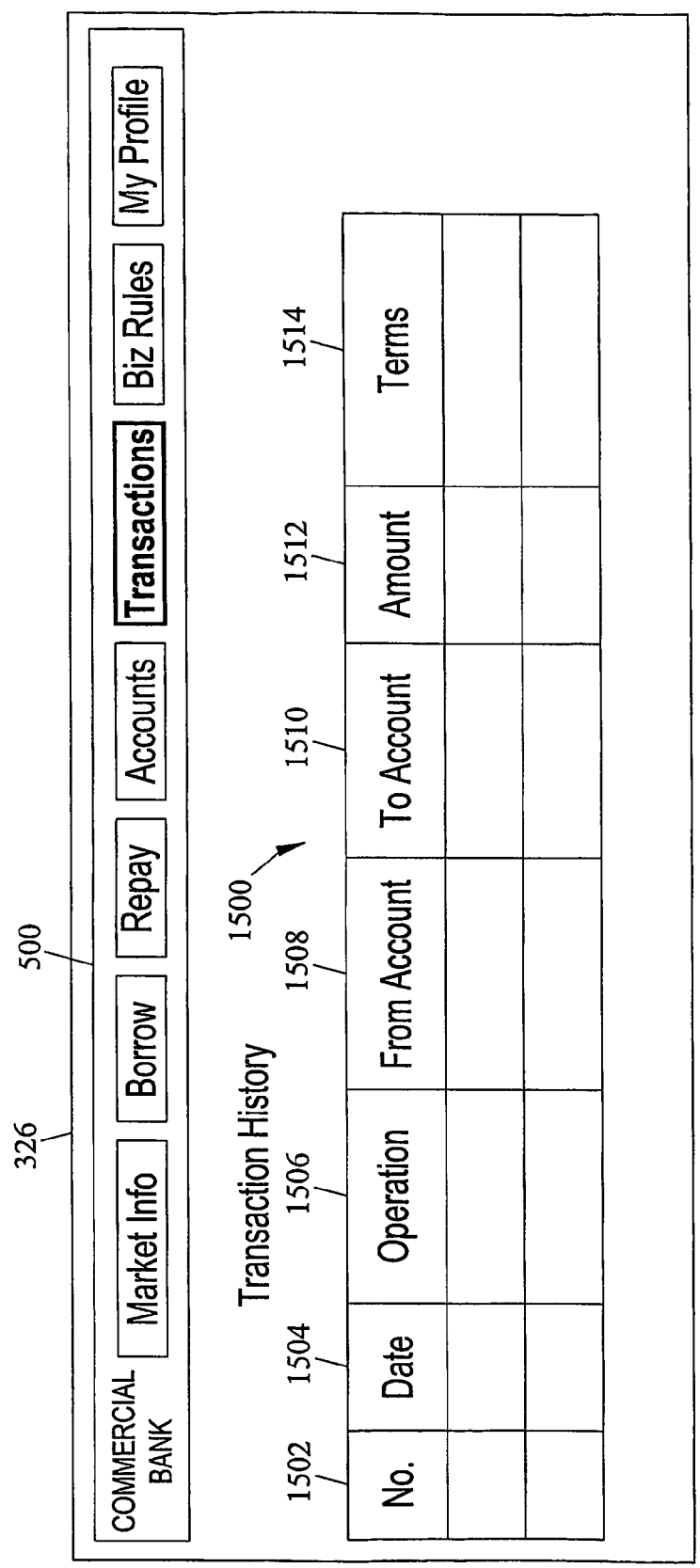
FIG. 15 is a block diagram of an exemplary transactions screen for a commercial bank in a system for facilitating transactions between commercial banks and pooled depositor groups according to an embodiment of the present invention.

FIG. 15 illustrates an exemplary transactions page 326 of commercial banks interface 118. In the illustrated example, transaction page 326 includes a transactions history table 1500 for storing information regarding transfers to and from a commercial bank's accounts with custodian 108. Transactions history table 1500 may include a transaction number field 1502, a date field 1504, an operation field 1506, a from account field 1508, a to account field 1510, an amount field 1512, and a terms field 1514. Transaction number field 1502 stores a number for a particular transaction. Date field 1504 stores the date of a transaction. Operation field 1506 stores the operation being performed, such as a withdrawal or a deposit. From account field 1508 specifies an account of a commercial bank from which funds are being withdrawn. To account field 1510 stores an account to which funds are being deposited. Amount field 1512 stores an amount of funds affected by the transaction. Finally, terms field 1514 stores the terms associated with a transaction.

FIG. 16 illustrates an exemplary business rules page 328 for commercial banks interface 118. In FIG. 16, the business rules page includes a business rules table 1600 for storing business rules particular to commercial banks. In the illustrated example, business rules table 1600 includes a number field 1602, a date created field 1604, condition fields 1606,

1608, and 1610, an action field 1612, a current status field 1614, and edit and delete fields 1616 and 1618. Number field 1602 stores an identifier for a particular business rule. Date created field 1604 stores a date on which a business rule is created. Condition field 1606, 1608, and 1610 store business rules for a commercial bank. Examples of business rules for a commercial bank may include terms over which funds would be needed. Action field 1612 stores an action to be performed if the conditions in fields 1606, 1608, and 1610 are met. Current status field 1614 stores the current status of a particular business rule. Finally, edit and delete fields 1616 and 1618 allow a commercial bank to edit or delete a business rule.

Figure 17:
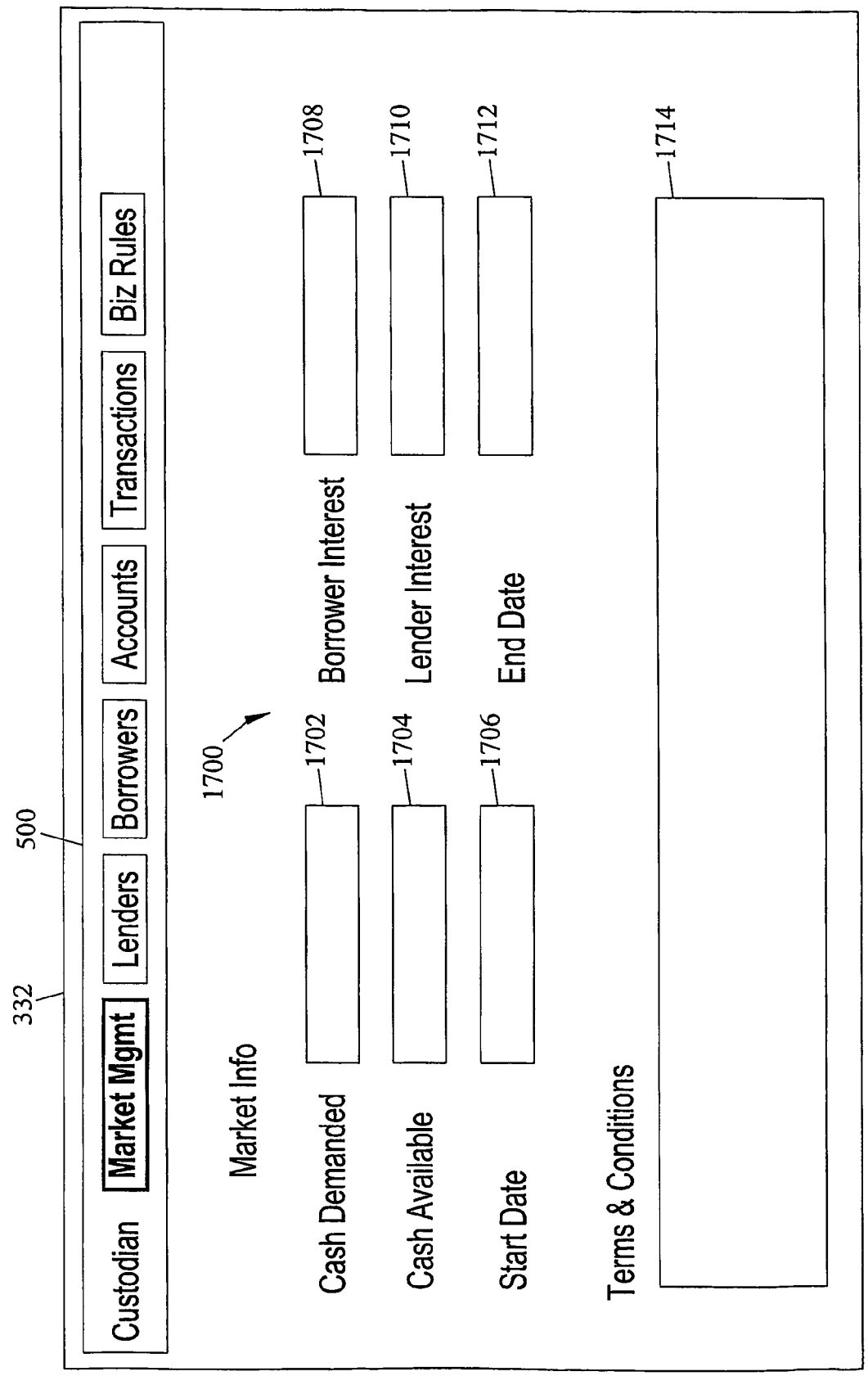
FIG. 17 is a block diagram of an exemplary market management screen for a custodian in a system for facilitating transactions between a commercial bank and a pooled depositor group according to an embodiment of the present invention.

FIG. 17 illustrates an exemplary market management page that may be displayed to custodian 108. In the illustrated example, market management page 332 includes a market information section 1700 for displaying overall market information to custodian 108. The market information section 1700 may include a cash demanded field 1702, a cash available field 1704, a start date field 1706, a borrower interest field 1708, a lender interest field 1712, and a terms and conditions field 1714. Cash demanded field 1702 may display cash demanded by commercial banks 114. Cash available field 1704 may display cash available from pooled depositor groups 100. Start date field 1706 may display the date on which cash is available. Borrower interest field 1708 may display the rate currently being paid by commercial banks 114. Lender interest field 1710 may display the interest rate being paid to pooled depositor groups 100. End date field 1712 may store the end date for a particular transaction. Finally, terms and conditions field 1714 may store terms and conditions associated with the current market.

Figure 18:
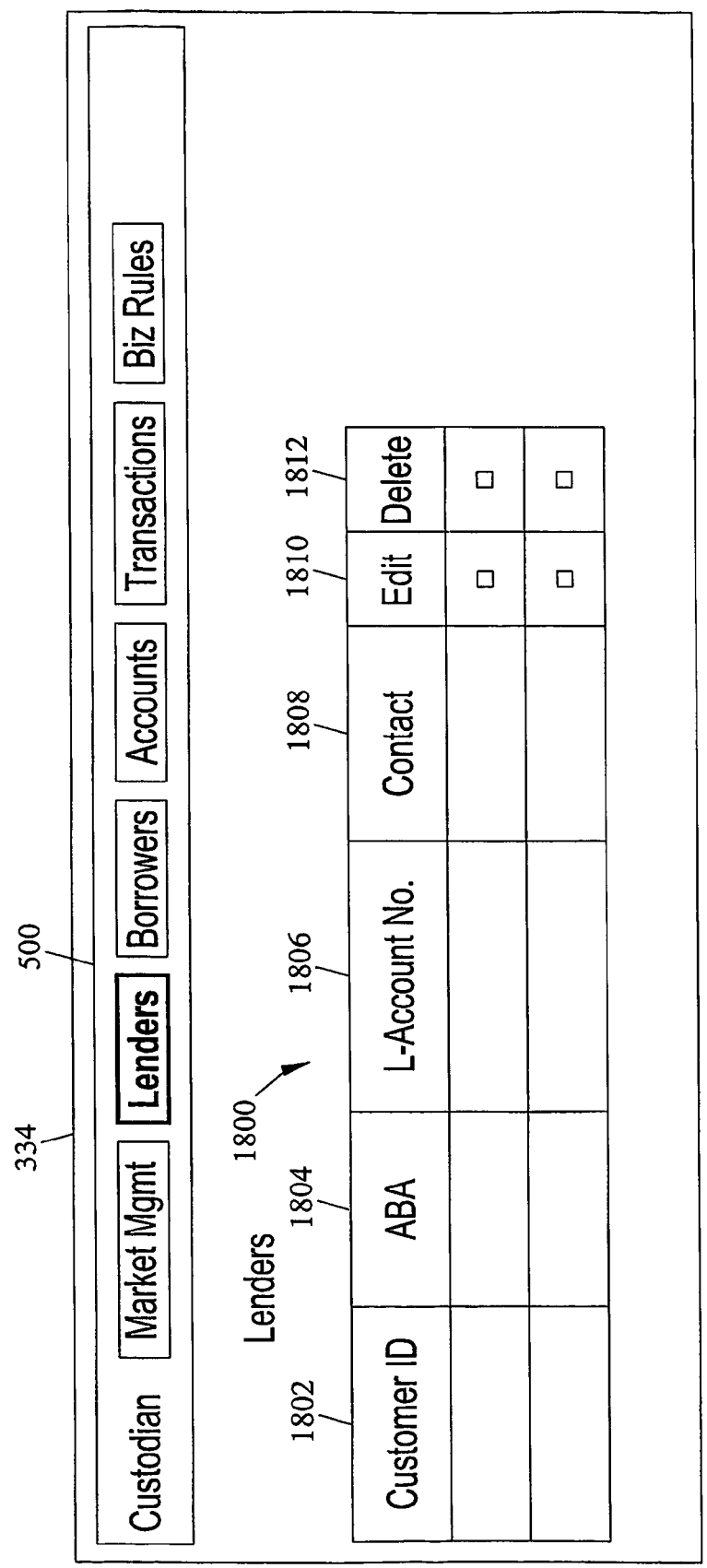
FIG. 18 is a block diagram illustrating an exemplary lenders screen for a custodian in a system for facilitating transactions between commercial banks and pooled depositor groups according to an embodiment of the present invention.

FIG. 18 illustrates an exemplary lenders page 324 associated with custodian interface 112. In the illustrated example, lenders page 324 includes a lender information table 1800 that displays information regarding a pooled depositor group. Lenders table 1800 includes a customer ID field 1800, an American Banker's Association (ABA) field 1804, an account number field 1806, a contact field 1808, and edit and delete fields 1810 and 1812. Customer ID field 1802 displays values for identifying a particular customer. American Banker's Association (ABA) field 1804 displays a unique identifier for each lender. Account number field 1806 stores account numbers associated with NOW accounts posted by a particular commercial bank. Contact field 1808 may store contact information for individuals responsible for posting accounts with custodian 108. Edit and delete fields 1810 and 1812 allow custodian 108 to change any of the data in the table.

Figure 19:
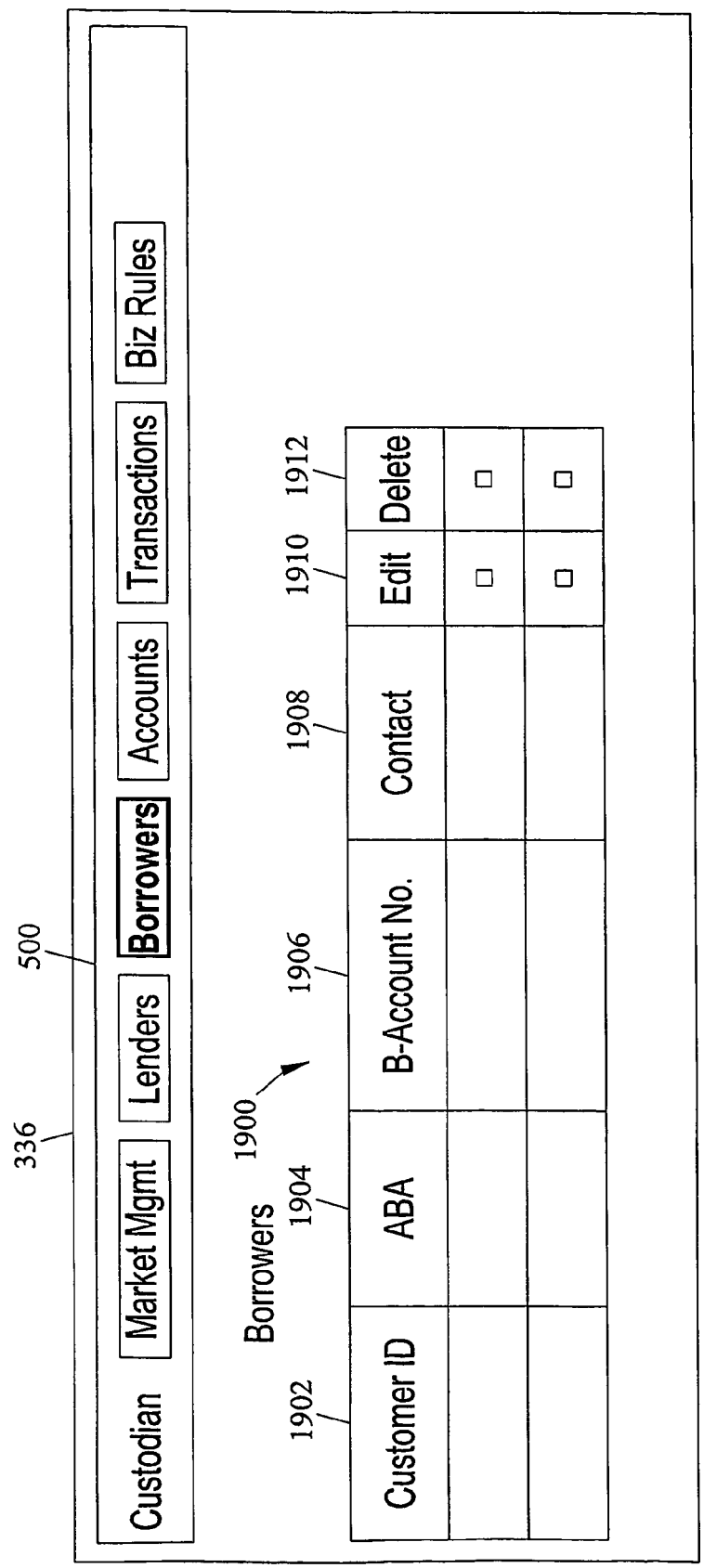
FIG. 19 is a block diagram illustrating an exemplary borrowers screen for a custodian in a system for facilitating transactions between commercial banks and pooled depositors groups according to an embodiment of the present invention.

FIG. 19 illustrates an exemplary borrowers page 336 of custodian interface 112. In the illustrated example, borrowers page 336 includes a borrowers table 1900 for displaying information about commercial banks 114. Borrowers table 1900 includes a customer ID field 1902, an ABA field 1904, an account number field 1906, a contact field 1908, and edit and delete fields 1910 and 1912. Customer ID field 1902 displays identifiers for a particular commercial bank. ABA field 1904 stores a unique identifier for each borrower. Account number field 1906 stores and displays account numbers associated with a particular commercial bank. Contact field 1908 stores and displays contact information associated with an individual at a commercial bank in charge of posting master NOW accounts. Edit and delete fields 1910 and 1912 allow custodian 108 to modify information in borrowers table 1900.

Figure 20:
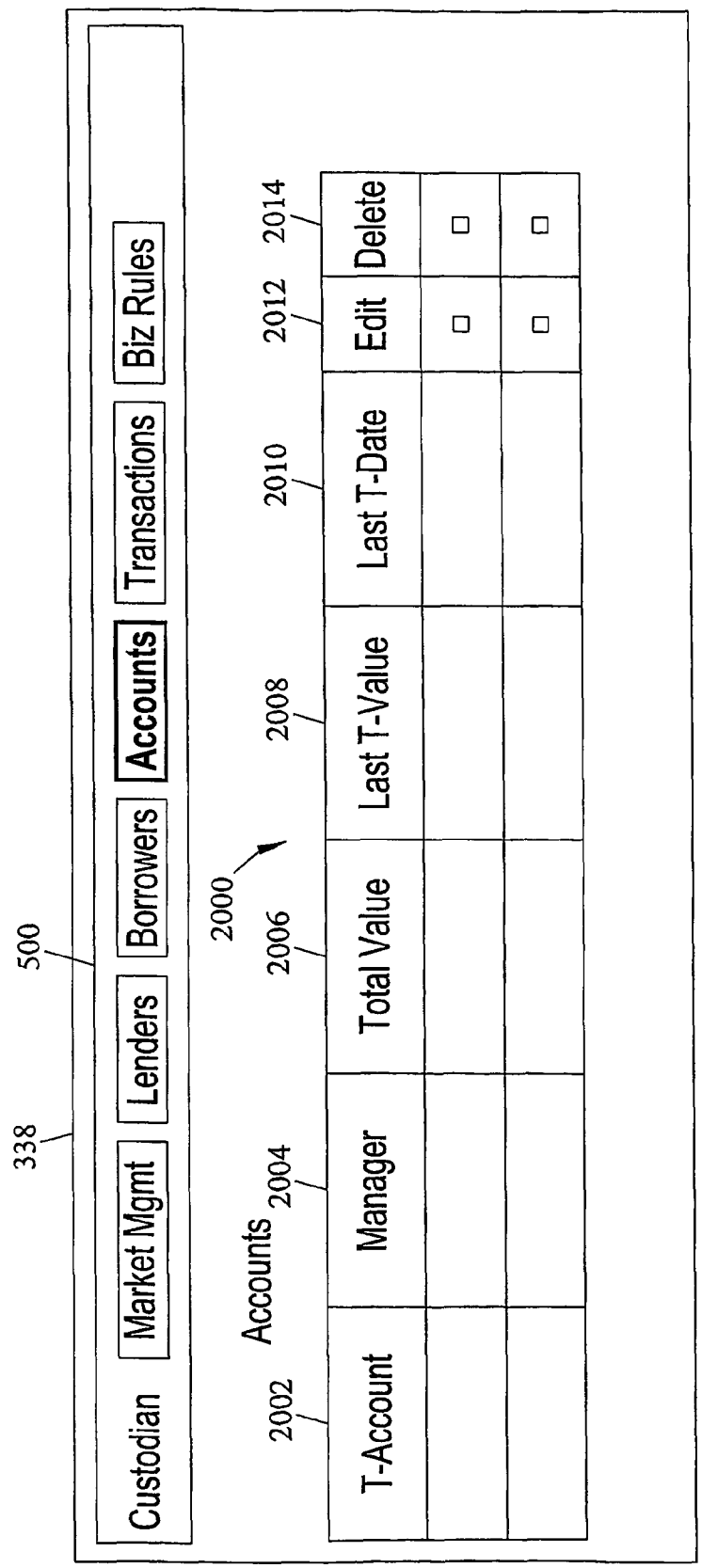
FIG. 20 illustrates an exemplary accounts screen for a custodian in a system for facilitating transactions between commercial banks and pooled depositor groups according to an embodiment of the present invention.

FIG. 20 illustrates an exemplary accounts page 338 associated with custodian interface 112. In the illustrated example, accounts page 338 includes an accounts table 2000 for storing information about accounts with custodian 108. Accounts table 2000 includes an account field 2002, a manager field 2004, a total value field 2006, a last traded value field 2008, a last traded date field 2010, and edit and delete fields 2012 and 2014. Account field 2002 stores identifiers for identifying a particular account. Manager field 2004 identifies the manager of a particular account. Total value field 2006 stores the total value of an account. Last traded value field 2008 stores the last traded value of a particular account. Last traded date field 2010 stores the last date on which the account was traded. Finally, edit and delete fields 2012 and 2014 allow custodian 108 to modify fields in account table 2000.

Figure 21:
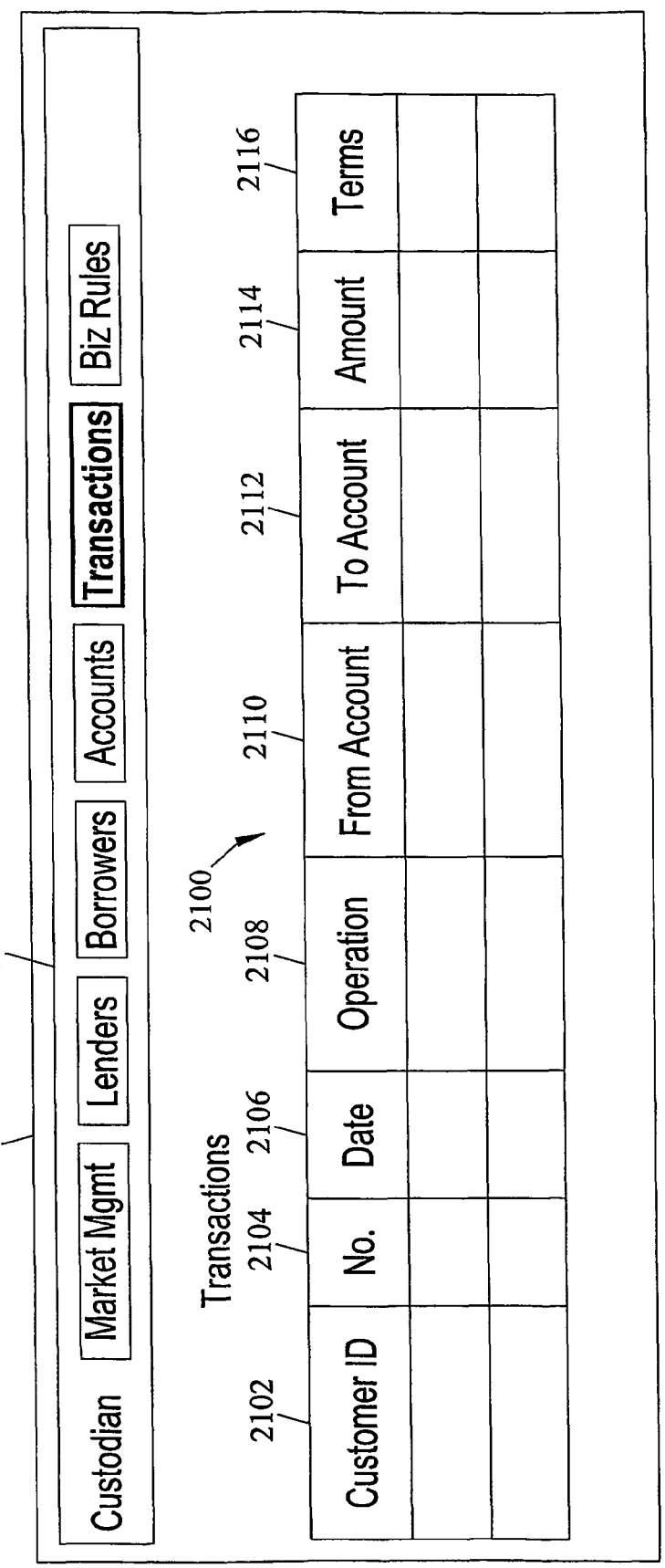
FIG. 21 is a block diagram illustrating an exemplary transactions screen for a custodian in a system for facilitating transactions between commercial banks and pooled depositor groups according to an embodiment of the present invention.

FIG. 21 illustrates an exemplary transactions page 340 of custodian interface 112. In the illustrated example, transactions page 340 includes a transaction table 2100 for storing and displaying information regarding transactions between pooled depositor groups 100 and commercial banks 114. Transactions table 2100 may include a customer ID field 2102, a transaction number field 2104, a date field 2106, an operation field 2108, a from account field 2110, a to account field 2112, an amount field 2114, and a terms field 2116. Customer ID field 2102 may store an identifier for a customer initiating a transaction. Number field 2104 may store an identifier for the transaction field. Date field 2106 may store the date on which the transaction occurred. Operation field 2108 may identify the type of transaction, i.e., withdrawal or deposit. From account field 2110 stores an account from which funds are being withdrawn. To account field 2112 stores an account to which funds are being deposited. Amount field 2114 stores the amount of the transaction. Terms field 2116 stores and displays terms associated with the transaction.

Figure 22:
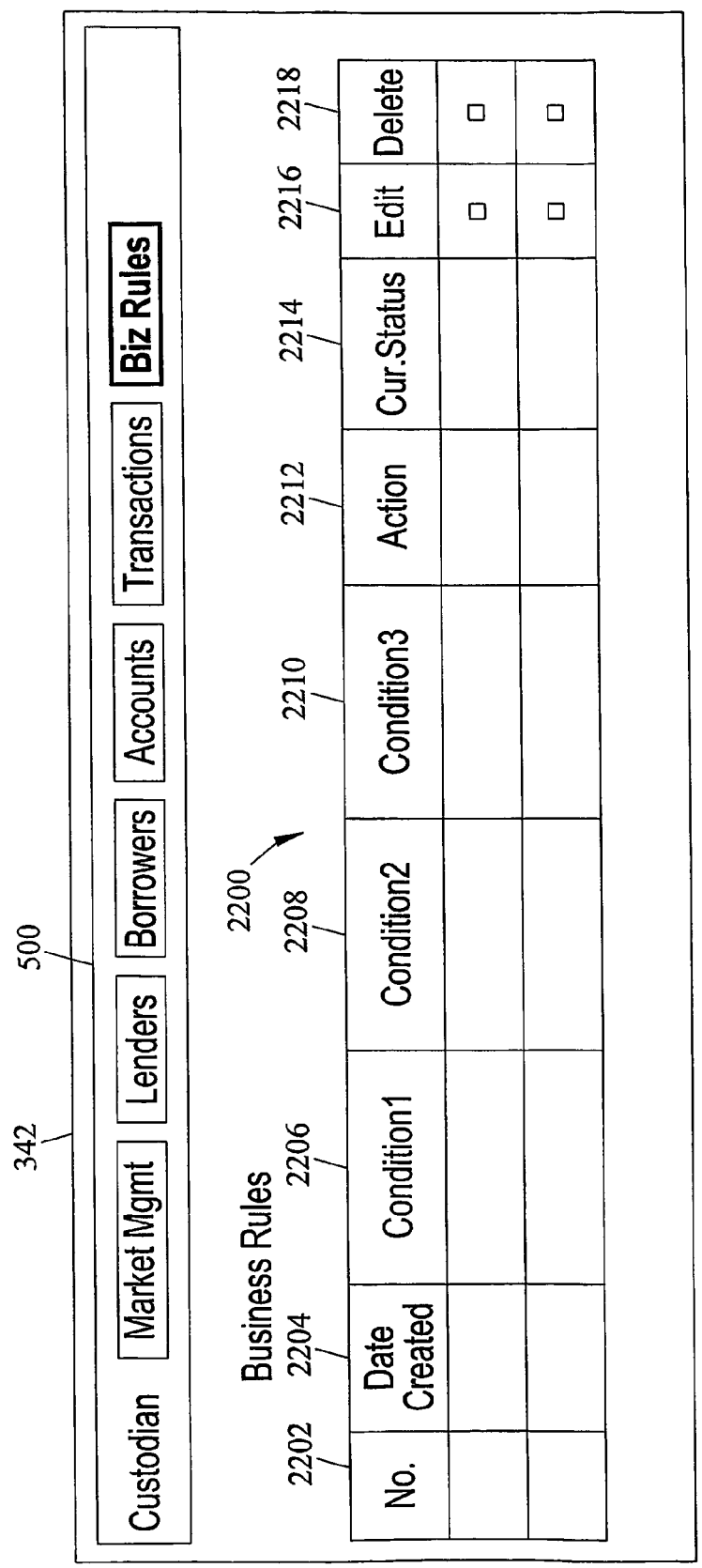
FIG. 22 is a block diagram illustrating an exemplary business rules screen for a custodian in a system for facilitating transactions between commercial banks and pooled depositor groups according to an embodiment of the present invention.

FIG. 22 illustrates an exemplary business rules page 342 of custodian interface 112. In the illustrated example, business rules page 342 includes a business rules table 2200 for storing business rules particular to a custodian. Custodian table 2200 may include a number field 2102, a date created field 2204, condition fields 2206, 2208, and 2210, an action field 2212, a current status field 2214, and edit and delete fields 2216 and 2218. Number field 2202 stores an identifier for a particular business rule. Date created field 2204 stores and displays the date on which a business rule is created. Condition fields 2206, 2208, and 2210 store conditions associated custodian created business rule. Examples of custodian business rules include list of depositor groups from which to receive deposits, lists of banks to which deposits are to be made, maximum amounts for deposits, and cut-off times for deposits on given days. Action field 2212 stores an action associated with a particular business rule. Current status field 2214 stores the current status of a business rule. Finally, edit and delete fields 2216 and 2218 allow custodian 108 to modify business rules in table 2200.

Figure 23:
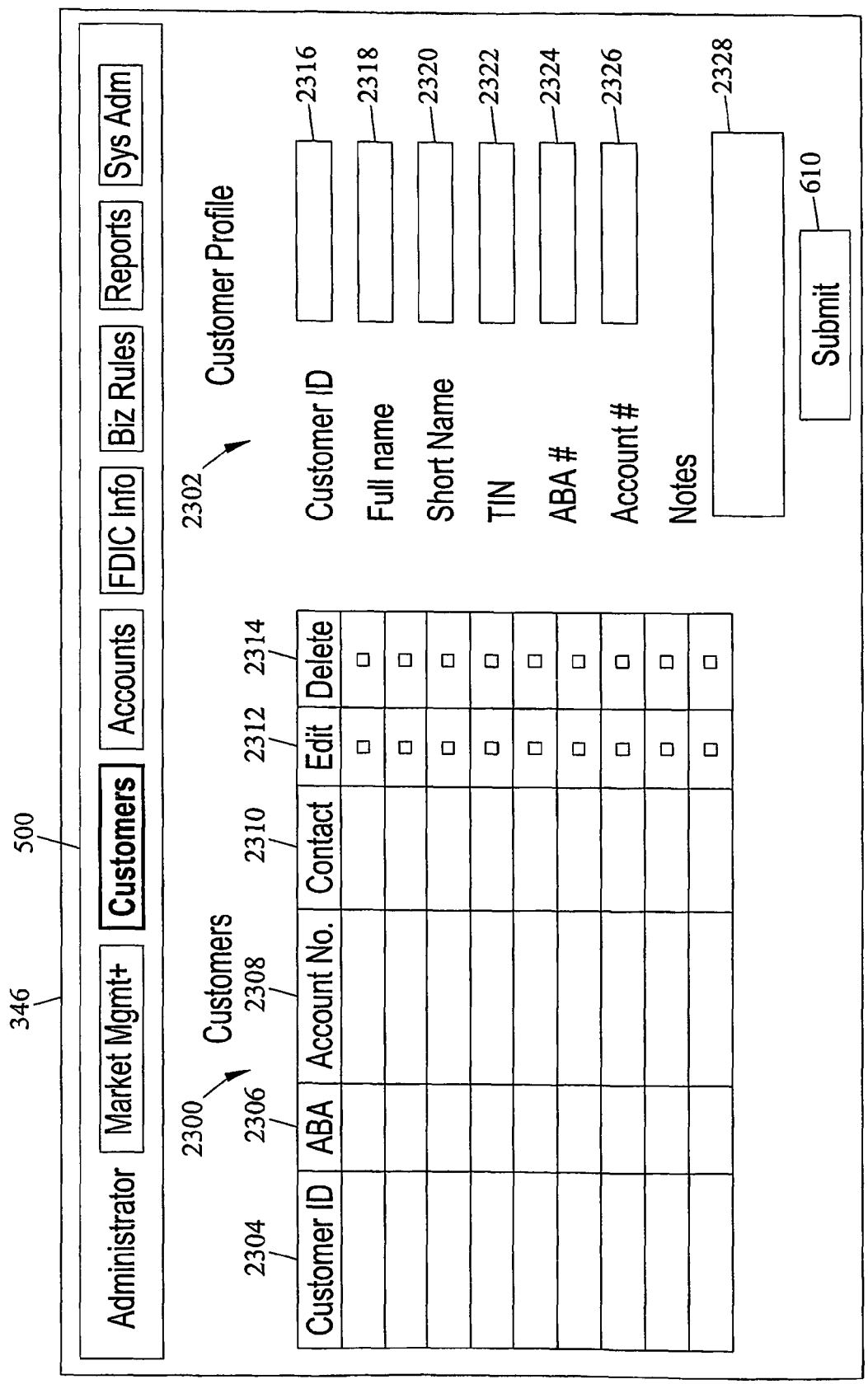
FIG. 23 is a block diagram illustrating an exemplary customer screen for an administrator a system for facilitating transactions between commercial banks and pooled depositor groups according to an embodiment of the present invention.

FIG. 23 illustrates an exemplary customers page that may be associated with control center administration interface 110. In the illustrated example, customers page 346 includes a customer section 2300 and a customer profile section 2302. Customer section 2300 includes a table having a customer ID field, an ABA field, an account number field, a contact information field, and edit and delete fields 2312 and 2314. Customer field 2304 stores identifiers for particular customers, including commercial banks and pooled depositor groups. ABA field 2306 stores a unique identifier for each customer. Account number field 2308 stores account numbers for each customer. Contact field 2310 stores and displays a contact person associated with each customer. Edit and delete fields 2312 and 2314 allow an administrator alter each field.

Customer profile section 2302 includes a customer ID field 2316, a full name field 2318, a short name field 2320, a taxpayer identification number (TI N) field 2322, an ABA number field 2324, an account field 2306, and a notes field 2308. Each of the fields in customer profile section 2312 is used to add customer entries to customer table 2300. Customer ID field 2316 is adapted to receive a customer name. Full name field 2318 receives the full name of a customer. Short name field 2320 may receive a shortened version of the customer name. TIN field 2322 receives a tax identification number. ABA field 2324 receives a unique identifier for each customer. Account number field 2326 receives account numbers for a particular customer. Notes field 2328 stores notes associated with a particular customer. Once an administrator has completed the fields in customer profile section 2302, the administrator may select submit button 610 to create a new entry in customers table 2300.

The remaining screens of administration interface 110 may be similar in format to those previously described. Administration interface 110 preferably allows the owners of control center 106 to collect sub-accounting information and transaction information from inventors 100. Administration interface 110 may also include functionality for allowing the owners of control center 106 to collect demand information from commercial banks 114. Administration interface 110 preferably also includes functionality for allowing control center 106 to instruct custodian 108 to transfer cash between depositors 100 and commercial banks 114. Yet another function that may be provided by administration interface 110 is the ability to calculate fees to be paid by commercial banks 114 to depositors 100 and to distribute these fees to the appropriate parties.

Example Transaction

As discussed above, the present invention facilitates transactions between pooled depositor groups 100 and commercial banks 114 by providing a convenient software interface for these groups to perform financial transactions. In one exemplary transaction, a commercial bank may register with control center 106 by accessing a registration web page provided by control center 106 and providing information that may be used by control center 106 to qualify the entity as a commercial bank. Once control center 106 qualifies the entity as a commercial bank, control center 106 provides a NOW account agreement to the commercial bank. Once the NOW account agreement is executed, control center 106 provides the commercial bank with a password and login ID to access a personalized commercial banks interface 118. The commercial bank uses commercial banks interface 118 to define its business rules and communicate deposit needs to custodian 108.

A depositor seeking to provide funds for deposit purposes accesses the registration web page provided by control center 106 and provides information usable by control center 106 to qualify the depositor. As discussed above, a pooled depositor group may be any group that is permitted to deposit funds in a NOW account. Such groups include municipalities, trust departments, pension funds, or any other group that can invest in a NOW account. Control center 106 also enters a deposit agreement with the depositor group. Once the agreement has been executed, control center 106 provides the depositor group with a password and login ID.

Once the depositor group receives its password and login ID, the depositor group accesses depositor interface 102 using the password and login ID and customizes the depositor interface to meet the depositor's business needs. For example, customizing the interface may include defining business rules associated with the particular depositor and specifying an amount of funds available for deposit. One particular business rule that the depositor may define includes whether or not all funds of all depositors are to be FDIC insured.

In order to deposit money, the depositor accesses depositor interface 102 and receives, in real time, the amount of money needed collectively by commercial banks 114 and the interest rate currently being paid for the money. If the interest rate is agreeable to the depositor group, the depositor group inputs information as to the amount of funds to be deposited, sub-accounting information, and when the funds are to be made available. This information is provided to control center 106. Control center 106 provides the sub-accounting information to custodian 108. Control center 106 also provides wiring instructions for the depositor group to transfer the money to custodian 108. Control center 106 informs custodian 108 to post the funds in a particular master NOW account. Custodian 108 may notify the commercial banks whose NOW accounts are being affected of the incoming cash. Control center 106 preferably also provides instructions to custodian 108 as to which banks to wire the funds.

As indicated above, the system illustrated in FIG. 1 preferably allows depositors 100 to withdraw funds deposited in a master NOW account on a daily basis without penalty. One method for withdrawing funds includes identifying the bank in which a particular depositor's funds are deposited and providing wiring instructions for the bank to wire the requested funds to be withdrawn to custodian 108 and wiring the funds from custodian 108 to the requesting depositor group. While this method works, it is expensive due to the wiring transaction fees involved in delivering the funds from commercial banks 114, to custodian 108, and to depositors 100. In addition, this method unnecessarily displaces cash currently held by banks 114.

In order to reduce transaction expenses associated with-drawals and to reduce displacement of cash held by commercial banks, custodian 108 may identify incoming deposits and withdrawal requests from depositors 100 on a given day, and, rather than requesting funds from a bank to satisfy withdrawal requests and then providing funds to the bank from an incoming deposit, custodian 108 may satisfy a withdrawal request from one depositor group using incoming funds from another depositor group. When this occurs, custodian 108 may simply update its accounting records so that ownership of the deposited funds of the depositor group requesting the withdrawal is changed to reflect that the depositor group whose incoming funds were used to satisfy the withdrawal is now the owner of the deposited funds. For example, if depositor group A requests a $50,000 withdrawal and depositor group B simultaneously deposits $100,000, custodian 108 may satisfy depositor group A's withdrawal request with $50,000 of depositor group B's incoming funds. Custodian 108 then updates its accounting records so that $50,000 of depositor group A's funds deposited in a particular NOW account are now owned by depositor group B. The remaining incoming funds from depositor group B may then be deposited in any master NOW account posted by commercial banks 114. By satisfying incoming withdrawal requests with incoming funds, custodian 108 reduces transaction fees and increases the depositor's return.

Although the methods and systems described above relate primarily to providing a convenient interface for pooled depositor groups and commercial banks that allows the pooled depositor groups to have a liquid, fully insured deposit, the present invention is not limited to such an embodiment. In an alternate embodiment, depositors 100 illustrated in FIG. 1 may desire to deposit funds in multiple commercial banks for other reasons, such as security reasons.

For example, depositors 100 may desire to deposit funds in commercial banks in multiple countries to reduce risks related to political or economic instability in the individual countries. In such an embodiment, commercial banks interface 118 may receive account postings from banks in different individual countries and may post the accounts with custodian 108. Depositors 100 may view the account postings via depositor interface 102 and select banks in different countries with which to deposit money based on the account postings. Control center 106 may then complete the transaction between the depositor and the individual banks selected by the depositor. Thus, the present invention may also be used to reduce the risk of depositing funds in banks in individual countries.

The methods and systems described above may also be utilized to allow the owners of control center 106 to auction funds to commercial banks. For example, if demand for cash deposits exceeds supply, the owners of control center 106 may auction funds to commercial banks in order to obtain a higher rate of return for depositors, a higher fee for providing access to a stable funds source, or both.

Thus, as described above, the present invention provides a convenient software interface for facilitating transactions between commercial banks and pooled depositor groups. The software interface may be implemented as web pages displayed to a custodian, pooled depositor groups, commercial banks, and an administrator. By aggregating deposit needs of multiple pooled depositor groups, the control center produces a stable source of funds for commercial banks that the commercial banks can consider as core deposits. In addition, because of the stable nature and volume of such funds, the commercial banks may be willing to pay a higher interest rate than the pooled depositor groups expect. As a result, the owners of the control center can generate revenue for facilitating the transactions.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for facilitating financial transactions between depositor groups and commercial banks, the method comprising:

registering, using a control center with at least one computer, a plurality of different depositor groups and a plurality of different commercial banks;

receiving, via the control center with at least one computer, contact from a plurality of different depositor groups indicating a deposit need of each of the different depositor groups, where each depositor group indicates to the control center an amount of funds available for deposit as demand deposits and a desired return on deposited funds;

aggregating, prior to the depositing of the funds available for deposit with the commercial banks and using the control center with the at least one computer, the deposit needs of the depositor groups to provide a stable funds source including the aggregated funds available from the plural different depositor groups, which are usable by the commercial banks as stable deposits;

notifying, using the control center with the at least one computer, the commercial banks of the availability of the stable funds source and an amount of funds available in the stable funds source;

setting, using the control center with the at least one computer, an interest rate to be paid to the depositor groups to a predetermined value based on an interest rate that the commercial banks are willing to pay for the stable funds source and an interest rate the depositor groups expect as a return for use of funds in the stable funds source;

determining, using the control center with the at least one computer, an amount of money collectively needed by the different commercial banks;

receiving, using the control center with the at least one computer, account postings from the commercial banks;

communicating, using the control center with the at least one computer, the interest rate to be paid to the depositor groups and the amount of money collectively needed by the different commercial banks to the depositor groups, receiving deposits, and depositing, using the control center with the at least one computer, funds from the stable funds source in the accounts; and allowing, using a control center with the at least one computer, the depositor groups to withdraw funds from the accounts on a demand basis without penalty, wherein determining deposit needs of a plurality of depositor groups includes determining deposit needs of different corporations and wherein aggregating the deposit needs includes aggregating funds from the corporations.

2. A method for facilitating financial transactions between depositor groups and commercial banks, the method comprising:

registering, using a control center with at least one computer, a plurality of different depositor groups and a plurality of different commercial banks receiving, via the control center with at least one computer, contact from a plurality of different depositor groups indicating a deposit need of each of the different depositor groups, where each depositor group indicates to the control center an amount of funds available for deposit as demand deposits and a desired return on deposited funds;

aggregating, prior to the depositing of the funds available for deposit with the commercial banks and using the control center with the at least one computer, the deposit needs of the depositor groups to provide a stable funds source including the aggregated funds available from the plural different depositor groups, which are usable by the commercial banks as stable deposits;

notifying, using the control center with the at least one computer, the commercial banks of the availability of the stable funds source and an amount of funds available in the stable funds source;

setting, using the control center with the at least one computer, an interest rate to be paid to the depositor groups to a predetermined value based on an interest rate that the commercial banks are willing to pay for the stable funds source and an interest rate the depositor groups expect as a return for use of funds in the stable funds source;

determining, using the control center with the at least one computer, an amount of money collectively needed by the different commercial banks;

receiving, using the control center with the at least one computer, account postings from the commercial banks;

communicating, using the control center with the at least one computer, the interest rate to be paid to the depositor groups and the amount of money collectively needed by the different commercial banks to the depositor groups, receiving deposits, and depositing, using the control center with the at least one computer, funds from the stable funds source in the accounts; and allowing, using the control center with the at least one computer, the depositor groups to withdraw funds from the accounts on a demand basis without penalty, wherein setting the interest rate to be paid to the depositor groups to a predetermined value includes setting the interest rate to a value equal to the interest rate that the commercial banks are willing to pay for the funds.

3. The method of claim 2 comprising receiving incoming deposits and withdrawal requests from the depositor groups, satisfying the incoming withdrawal requests using the incoming deposits, and updating account records to change ownership of deposited funds without withdrawing funds from the commercial banks.

4. The method of claim 2 wherein depositing funds in the accounts includes depositing funds in excess of a federal deposit insurance limit from a single depositor group in an account of a single commercial bank and providing federal deposit insurance or a collateral for the entire deposit.

5. The method of claim 2 wherein the commercial banks report the funds deposited in the accounts as core deposits.

6. The method of claim 2 wherein the depositor groups comprise pooled depositor groups and wherein the accounts comprise master negotiated order of withdrawal accounts.

7. A method for facilitating financial transactions between commercial banks and depositors, the method comprising:

registering, using a control center with at least one computer, a plurality of different depositor groups and a plurality of different commercial banks;

receiving, via the control center with at least one computer, deposit account postings from a plurality of different commercial banks;

determining, via the control center with the at least one computer, contact from a plurality of different depositors and aggregating, prior to the depositing of the funds available for deposit with the commercial banks and using the control center with the at least one computer, the deposit needs of the depositors to provide a stable funds source including the aggregated funds available from the plural different depositor groups, which are usable by the different commercial banks as stable deposits;

determining, using the control center with the at least one computer, an amount of money collectively needed by the different commercial banks;

receiving, using the control center with the at least one computer, account postings from the commercial banks; and matching the deposit need with the deposit account postings in a manner that provides deposit insurance for funds deposited by the depositor, wherein matching the deposit need with the deposit account postings includes auctioning available deposits of the at least one depositor to the commercial banks.

8. The method of claim 7 wherein the depositor comprises an individual entity.

9. The method of claim 8 wherein the individual entity comprises a human being.

10. The method of claim 8 wherein the individual entity comprises a corporation.

11. A computer program product comprising computer-executable instructions embodied in a computer-readable medium for performing steps comprising:

registering, using a control center with at least one computer, a plurality of different depositor groups and a plurality of different commercial banks;

receiving, via the control center with at least one computer, contact from a plurality of different depositor groups indicating a deposit need of each of the different depositor groups, where each depositor group indicates to the control center an amount of funds available for deposit as demand deposits and a desired return on deposited funds;

aggregating, prior to the depositing of the funds available for deposit with the commercial banks and using the control center with the at least one computer, the deposit needs of the depositor groups to provide a stable funds source including the aggregated funds available from the plural different depositor groups, usable by the different commercial banks as stable deposits;

notifying, using the control center with the at least one computer, the commercial banks of the availability of the stable funds source and an amount of funds available in the stable funds source;

setting, using the control center with the at least one computer, an interest rate to be paid to the depositor groups to a predetermined value based on an interest rate that the commercial banks are willing to pay for the stable funds source and an interest rate the depositor groups expect as a return for use of funds in the stable funds source;

determining, using the control center with the at least one computer, an amount of money collectively needed by the different commercial banks;

receiving, using the control center with the at least one computer, account postings from the commercial banks;

communicating, using the control center with the at least one computer, the interest rate to be paid to the depositor groups and the amount of money collectively needed by the different commercial banks to the depositor groups, receiving deposits, and depositing funds from the stable funds source in the accounts; and allowing, using the control center with the at least one computer, depositor groups to withdraw funds from the accounts on a demand basis without penalty, wherein determining deposit needs of a plurality of depositor groups includes determining deposit needs of different corporations and wherein aggregating the deposit needs includes aggregating funds from the corporations.

12. A computer program product comprising computer-executable instructions embodied in a computer-readable medium for performing steps comprising:

registering, using a control center with at least one computer, a plurality of different depositor groups and a plurality of different commercial banks;

receiving, via the control center with at least one computer, contact from a plurality of different depositor groups indicating a deposit need of each of the different depositor groups, where each depositor group indicates to the control center an amount of funds available for deposit as demand deposits and a desired return on deposited funds;

aggregating, prior to the depositing of the funds available for deposit with the commercial banks and using the control center with the at least one computer, the deposit needs of the depositor groups to provide a stable funds source including the aggregated funds available from the plural different depositor groups, which are usable by the commercial banks as stable deposits;

notifying, using the control center with the at least one computer, the commercial banks of the availability of the stable funds source and an amount of funds available in the stable funds source;

setting, using the control center with the at least one computer, an interest rate to be paid to the depositor groups to a predetermined value based on an interest rate that the commercial banks are willing to pay for the stable funds source and an interest rate the depositor groups expect as a return for use of funds in the stable funds source;

determining, using the control center with the at least one computer, an amount of money collectively needed by the different commercial banks;

receiving, using the control center with the at least one computer, account postings from the commercial banks;

communicating, using the control center with the at least one computer, the interest rate to be paid to the depositor groups and the amount of money collectively needed by the different commercial banks to the depositor groups, receiving deposits, and depositing, using the control center with the at least one computer, funds from the stable funds source in the accounts; and allowing, using the control center with at least one computer, depositor groups to withdraw funds from the accounts on a demand basis without penalty, wherein setting the interest rate to be paid to the depositor groups to a predetermined value includes setting the interest rate to a value equal to the interest rate that the commercial banks are willing to pay for the funds.

13. The computer program product of claim 12 comprising receiving incoming deposits and withdrawal requests from the depositor groups, satisfying the incoming withdrawal requests using the incoming deposits, and updating account records to change ownership of deposited funds without withdrawing funds from the commercial banks.

14. The computer program product of claim 12 wherein depositing funds in the accounts includes depositing funds in excess of a federal deposit insurance limit from a single depositor group in an account of a single commercial bank and providing federal deposit insurance or collateral for the entire deposit.

15. The computer program product of claim 12 wherein the commercial banks report the funds deposited in the accounts as core deposits.

16. The computer program product of claim 12 wherein the depositor groups comprise pooled depositor groups and wherein the accounts comprise master negotiated order of withdrawal accounts.

* * * * *